United States Patent [19]

Terada et al.

[11] Patent Number: 5,564,635
[45] Date of Patent: Oct. 15, 1996

[54] APPARATUS FOR DRY DISINTEGRATION OF USED PAPER

[75] Inventors: Mitsuo Terada; Satoshi Kiyose, both of Takasago; Tetsuro Matsumoto, Kobe; Hiroyuki Tanaka, Takasago; Takeshi Inaba, Takasago; Hisanori Shimakura, Takasago; Hirokazu Shiota, Tokyo, all of Japan

[73] Assignee: Kabushiki Kaisha Kobe Seiko Sho, Kobe, Japan

[21] Appl. No.: 313,895

[22] Filed: Sep. 28, 1994

[30] Foreign Application Priority Data

| | | | |
|---|---|---|---|
| Sep. 29, 1993 | [JP] | Japan | 5-265895 |
| Oct. 22, 1993 | [JP] | Japan | 5-264936 |
| Nov. 10, 1993 | [JP] | Japan | 5-060458 |
| Dec. 2, 1993 | [JP] | Japan | 5-064624 |
| Dec. 2, 1993 | [JP] | Japan | 5-302878 |
| Dec. 3, 1993 | [JP] | Japan | 5-064809 |
| Dec. 27, 1993 | [JP] | Japan | 5-332448 |

[51] Int. Cl.$^6$ .............. B02C 7/02; B02C 13/10; B02C 23/28
[52] U.S. Cl. .............. 241/55; 241/57; 241/162; 241/163; 241/188.1; 241/189.1; 241/242; 241/245; 241/260
[58] Field of Search .............. 241/41, 55, 57, 241/58, 157, 162, 163, 188.1, 189.1, 242, 245, 260

[56] References Cited

U.S. PATENT DOCUMENTS

| | | | |
|---|---|---|---|
| 3,549,093 | 12/1970 | Pallmann | 241/55 X |
| 3,873,034 | 3/1975 | Iwahori et al. | 241/55 |
| 3,917,175 | 11/1975 | Maeda et al. | 241/55 X |
| 4,101,080 | 7/1978 | Schmidt | 241/55 X |

FOREIGN PATENT DOCUMENTS

| | | | |
|---|---|---|---|
| 1063223 | 12/1953 | France | 241/55 |
| 1521367 | 11/1989 | U.S.S.R. | 241/55 |
| 1472705 | 5/1977 | United Kingdom . | |
| 1518906 | 7/1978 | United Kingdom . | |

*Primary Examiner*—Timothy V. Eley
*Attorney, Agent, or Firm*—Oblon, Spivak, McClelland, Maier, & Neustadt, P.C.

[57] ABSTRACT

According to the present invention there are provided a method and an apparatus capable of disintegrating used paper into long pulp fibers without tearing it mechanically. In the apparatus, a wall surface having an undulating section is formed on an inner side of a gas flow path, with a current of air having a velocity component parallel to the wall surface and a velocity component perpendicular to and striking against the wall surface is allowed to pass through the gas flow path. Finely cut used paper pieces are allowed to pass through the gas flow path while being carried by the air current. The parallel velocity component of the air current is set at 40 m or more. An impeller is mounted within a circular casing body having an inlet port and an outlet port, and undulating teeth are formed on the inner peripheral surface of the circular casing body. The used paper, which is sucked in from the above inlet port together with the air current, is cut beforehand into pieces. A distance, L0, between the outer peripheral edge of a disc of the impeller and each addendum tip of the undulating teeth of the circular casing body is set at a value not smaller than ten times the thickness of each used paper piece.

18 Claims, 15 Drawing Sheets

ROTATING DIRECTION OF IMPELLER

ROTATING DIRECTION OF IMPELLER

APPARATUS FOR DRY DISINTEGRATION OF USED PAPER

BACKGROUND OF THE INVENTION

1. Field of the Invention:

The present invention relates to a method and apparatus for disintegrating used paper into fluffy pulp fibers in accordance with a dry process.

2. Description of the Prior Art:

Heretofore, as an apparatus for dry disintegration of used paper there has been proposed such an apparatus as illustrated in FIGS. 19 to 21. This conventional used paper disintegrating apparatus is provided with a circular casing body 110 and an impeller 120, the circular casing body 110 having an inlet port 111 and an outlet port 112 and further having undulating teeth 114 which are formed circumferentially on the inner peripheral surface of the circular casing body and are undulating in section, and the impeller 120 being mounted coaxially within the circular casing body 110 through a clearance formed between the impeller and the undulating teeth 114. The inlet port 111 and the outlet port 112 are open tangentially in the peripheral surface of the circular casing body 110.

In the above conventional apparatus, by a current of air generated with rotation of the impeller 120, finely cut pieces of used paper M are sucked in from the inlet port 111 together with the air current. The used paper pieces M thus sucked in are caught by the undulating teeth 114 as shown in FIG. 20 under the action of a rotating current which is generated by the rotation of the impeller 120. One ends of the used paper pieces M are retained by the undulating teeth 114, while the opposite ends thereof are beaten by blades 122 of the impeller 120 which are rotating at high speed, whereby the used paper is disintegrated while being torn off.

In connection with the above conventional disintegration principle, various other explanations have so far been made such as, for example, an explanation to the effect that the used paper pieces M are disintegrated by ultrasonic vibration using a high-speed air current, and an explanation to the effect that the used paper pieces strike against the undulating teeth or roll thereon and are thereby disintegrated. However, according to a phenomenon observed most frequently in ultra-high speed photographing, a large number of used paper pieces M are sandwiched in between the addendum tips of teeth 114 and the distal ends of the blades 122 of the impeller 120 and are torn or ground simultaneously for disintegration, as shown in FIG. 21, (such a way of disintegration involving tearing or grinding of used paper pieces M and the foregoing disintegration method involving tearing of used paper pieces will hereinafter be referred to genetically as "mechanical disintegration").

According to the conventional apparatus for dry integration of used paper described above, however, about 30% to 50% or more in weight ratio of powder is incorporated in the disintegrated pulp fibers of used paper, and thus the amount of powder produced is large. Besides, the length of the disintegrated pulp fibers is short.

Such pulp fibers of used paper with a large amount of powder incorporated therein are an obstacle to their subsequent re-utilization. For example, it is known that if they are used as the starting material of recycled paper, a marked deterioration of the paper toughness will result. This problem my be solved by separating and removing the powder after disintegration. However, in the disintegrated used paper, pulp fibers are in a complicatedly entangled state like fluff and the powder is caught by such entangled pulp fibers, so it cannot easily be separated and removed.

The present inventors have made studies for finding out conditions to minimize the formation of powder in the conventional apparatus and thereby solve the abovementioned problems while varying the number of revolutions of the impeller 120, the size and shape of used paper pieces M, the amount thereof to be fed, the velocity of air current (amount of air), sectional shape of the undulating teeth 114, and the clearance between the addenda of the teeth 114 and the outer peripheral edge of the impeller member 120. As a result, we found out that under a certain condition a high proportion of used paper pieces M came to have a predetermined rigidity like wooden pieces while being conveyed pneumatically with a current of air generated by the rotation of the impeller 120 and came into collision with the undulating teeth 114, resulting in the collided portions being beaten successively or the whole thereof being disintegrated almost instantaneously (hereinafter referred to as "pneumatic disintegration" in contrast with mechanical disintegration) with scarcely any contact of the used paper pieces M with the impeller 120, that is, unlike the mechanical disintegration involving cutting or grinding of the used paper pieces.

The used paper pieces M, not coming into contact with the impeller 120, strike against slant faces of the undulating teeth 114 and are disintegrated thereby while being conveyed pneumatically by a current of air. The pulp fibers of the used paper pieces thus disintegrated were longer in average fiber length and much smaller in the amount of powder produced in comparison with those disintegrated mechanically.

When in view of the above test results the clearance between the addenda of the undulating teeth 114 and the outer peripheral edge of the impeller 120 was enlarged to not less than 1 mm in order to minimize the influence of the impeller 120, it was possible to make sure that the proportion of powder incorporated in the disintegrated pulp fibers was high and that the proportion of long fibers in the disintegrated pulp fibers was very high. In other words, it turned out that the conventional apparatus involved the problem of disintegrated pulp fibers being short and the amount of powder produced large because of mechanical disintegration of finely cut used paper pieces.

SUMMARY OF THE INVENTION

Accordingly, it is the object of the present invention to provide a method and apparatus for dry disintegration of used paper which perform the disintegration by pneumatic beating, not mechanical disintegration involving cutting or grinding of finely cut pieces of used paper, and which thereby permits disintegration of used paper into long pulp fibers and permits reduction in the proportion of undisintegrated paper to attain a high percent disintegration of the starting used paper.

In the first aspect of the present invention there is provided a method for dry disintegration of used paper, comprising providing a wall surface of an undulating section on an inner side of a gas flow path, allowing a current of air to pass through the said gas flow path, the said air current having both a velocity component parallel to the said wall surface and a velocity component perpendicular to and striking against the said wall surface, and allowing finely cut pieces of used paper to pass through the said gas flow path while being carried by the said air current.

In the second aspect of the present invention there is provided a method for dry disintegration of used paper, comprising providing a wall surface of an undulating section on an inner side of a gas flow path, allowing a current of air to pass through the said gas flow path, the said air current having both a velocity component of 40 m or more per second parallel to the said wall surface and a slight velocity component perpendicular to and striking against the said wall surface, and allowing used paper pieces finely cut rectangularly to pass through the said gas flow path while being carried by the said air current.

In the third aspect of the present invention there is provided an apparatus for dry disintegration of finely cut pieces of used paper into fluffy pulp fibers, comprising:

a circular casing body having an inlet port for sucking in the used paper pieces together with a current of air and an outlet port for discharging the disintegrated pulp fibers together with the current of air, the circular casing body further having undulating teeth of an undulating section formed circumferentially on its inner peripheral surface;

an impeller adapted to rotate at a peripheral speed of 40 m or more per second and having a disc and blades formed radially on one end face of the disc, the impeller being mounted coaxially within the circular casing body through a clearance formed between the impeller and the undulating teeth of the circular casing body, the clearance distance between the outer peripheral edge of the disc of the impeller and each addendum tip of the said undulating teeth being not less than ten times the thickness of each used paper piece, and the ratio of the said clearance distance to the width of each of the said blades in the direction parallel to the rotational axis of the impeller being not higher than 0.3; and a drive motor mounted to one end face of the circular casing body, the drive motor causing rotation of the impeller to suck the used paper pieces into the circular casing body together with the air current through the inlet pork of the casing body and conduct them into the said clearance.

In the fourth aspect of the present invention there is provided an apparatus for dry disintegration of used paper according to the above third aspect, wherein a driving shaft of the drive motor is connected to the opposite end face side of the impeller, the inlet port of the circular casing body is open centrally of the opposite end face of the casing body, and the outlet port of the casing body is open tangentially of the peripheral surface of the casing body in a position closer to the drive motor side relative to the disc.

In the fifth aspect of the present invention there is provided an apparatus for dry disintegration of used paper according to the above third or fourth aspect, wherein the blades of the impeller are short in the radial direction of the impeller and long in the axial direction of the impeller.

In the sixth aspect of the present invention there is provided an apparatus for dry disintegration of used paper according to the above third or fourth aspect, wherein the blades of the impeller are curved on their outer peripheral end side in the rotating direction of the impeller.

In the seventh aspect of the present invention there is provided an apparatus for dry disintegration of used paper according to the above third or fourth aspect, wherein the blades of the impeller are curved on their outer peripheral end side in the direction opposite to the rotating direction of the impeller.

In the eighth aspect of the present invention there is provided an apparatus for dry disintegration of used paper according to the above seventh aspect, wherein each blade of the impeller has a gap formed in a position close to its outer peripheral end, the said yap providing communication between the convex side and the concave side of the curved blade to permit passage of the air current therethrough.

In the ninth aspect of the present invention there is provided an apparatus for dry disintegration of used paper according to the above third or fourth aspect, wherein the blades of the impeller are projecting radially outwards from the outer peripheral edge of the disc.

In the tenth aspect of the present invention there is provided an apparatus for dry disintegration of used paper according to the above third or fourth aspect, wherein the outer peripheral ends of the blades of the impeller and the outer peripheral edge of the disc are in registration with each other.

In the eleventh aspect of the present invention there is provided an apparatus for dry disintegration of finely cut pieces of used paper into fluff pulp fibers, comprising:

a circular casing body having undulating teeth of an undulating section formed circumferentially on its inner peripheral surface;

a plurality of impellers each adapted to rotate at a peripheral speed of 40 m or more per second and having a disc and blades formed radially on one end face of the disc, the impellers being mounted coaxially within the circular casing body through a clearance formed between the impellers and the undulating teeth of the circular casing body, the clearance distance between the outer peripheral edge of the disc of each impeller and each addendum tip of the undulating teeth being not less than ten times the thickness of each used paper piece, and the ratio of the said clearance distance to the sum of each blade widths of the plural impellers in the direction parallel to the rotational axis of the impellers being not higher than 0.3;

a drive motor mounted to one end face of the circular casing body and having a driving shaft connected to the impellers from the opposite end side of the impellers, the drive motor causing rotation of the impellers to suck the used paper pieces into the circular casing body together with a current of air and conduct them into the said clearance;

an inlet port which is open centrally of the opposite end face of the circular casing body to suck in the used paper pieces together with the air current; and an outlet port which is open tangentially of the peripheral surface of the circular casing body in a position closer to the drive motor side relative to the disc to discharge the disintegrated fibers together with the air current.

In the twelfth aspect of the present invention there is provided an apparatus for dry disintegration of used paper according to the above eleventh aspect, wherein the blades of the impellers are short in the radial direction of the impellers and long in the axial direction of the impellers.

In the thirteenth aspect of the present invention there is provided an apparatus for disintegration of used paper according to the above eleventh aspect, wherein the blades of the impellers are curved on their outer peripheral end side in the rotating direction of the impellers.

In the fourteenth aspect of the present invention there is provided an apparatus for dry disintegration of used paper according to the above eleventh aspect wherein the blades of the impeller are curved on their outer peripheral end side in the direction opposite to the rotating direction of the impellers.

In the fifteenth aspect of the present invention there is provided an apparatus for dry disintegration of used paper according to the above fourteenth aspect, wherein the blades of the impellers each have a gap formed in a position close to its outer peripheral end, the said gap providing communication between the convex side and the concave side of the curved blade to permit passage of the air current therethrough.

In the sixteenth aspect of the present invention there is provided an apparatus for dry disintegration of used paper according to the above eleventh aspect, wherein the blades of the impellers are projecting radially outwards from the outer peripheral edge of the disc.

In the seventeenth aspect of the present invention there is provided an apparatus for dry disintegration of used paper according to the above eleventh aspect, wherein the outer peripheral ends of the blades of the impellers and the outer peripheral edge of the disc are in registration with each other.

In the eighteenth aspect of the present invention there is provided an apparatus for dry disintegration of finely cut pieces of used paper into fluffy pulp fibers, comprising:

a circular casing body having an inlet port for sucking in the used paper pieces together with a current of air and an outlet port for discharging the disintegrated pulp fibers together with the current of air, the circular casing body further having undulating teeth of an undulating section formed circumferentially on its inner peripheral surface;

an impeller mounted coaxially within the circular casing body through a clearance formed between the impeller and the undulating teeth of the circular casing body, the impeller having a disc and blades formed radially on one end face of the disc;

a drive motor mounted to one end face of the circular casing body, the drive motor causing rotation of the impeller to suck the used paper pieces into the circular casing body together with the air current through the inlet port of the casing body and conduct them into the said clearance; and a compressed gas injection hole formed in the circular casing body to eject compressed gas for removing used paper pieces and disintegrated fibers deposited on the blades of the impeller.

In the nineteenth aspect of the present invention there is provided an apparatus for dry disintegration of finely cut pieces of used paper into fluffy pulp fibers, comprising:

a circular casing body having an inlet port for sucking in the used paper pieces together with a current of air, an outlet port for discharging the disintegrated pulp fibers together with the current of air, and undulating teeth of an undulating section formed circumferentially on its inner peripheral surface;

an impeller mounted coaxially within the circular casing body through a clearance between the impeller and the undulating teeth, the impeller having a disc and blades formed radially on one end face of the disc;

a used paper suction nozzle connected to the inlet port of the circular casing body, the used paper suction nozzle having a suction port at a front end thereof, a discharge port at a base end thereof which discharge port is smaller in inside diameter than the suction port, a hollow chamber formed intermediate between the suction port and the discharge port and having an inside diameter larger than that of the suction port, and further having a throttle portion formed intermediate between the suction port and the hollow chamber; and a drive motor mounted to one end face of the circular casing body, the drive motor causing rotation of the impeller to suck the used paper pieces into the circular casing body together with the air current through the used paper suction nozzle and further through the inlet port of the casing body and conduct them into the said clearance.

In the twentieth aspect of the present invention there is provided an apparatus for dry disintegration of used paper, including an impeller mounted within a circular casing body having an inlet and an outlet port, with grooves parallel to the axis of the impeller being formed in the inner peripheral surface of the circular casing body, in which apparatus the distance, L0, between the outer peripheral end of each blade of the impeller and the addendum tip of the groove opposed thereto and formed in the inner peripheral surface of the circular casing body is not less than ten times the thickness of the used paper, the ratio of the distance L0 to the width, W, of each blade in the direction parallel to the rotational axis of the impeller, i.e. L0/W, is not higher than 0.3, and the peripheral speed of the impeller is set at 40 m or more per second.

In the method for dry disintegration of used paper according to the present invention, as shown in FIGS. 1 and 4(a)–4(c), used paper pieces M which have entered a gas flow path R while being carried by a current of air are then conveyed through the path R pneumatically by a velocity component of the air current which component is parallel to the path R. During this pneumatic conveyance, the used paper pieces M are pushed against undulating teeth 14 of an undulating section formed on a wall surface 1 by virtue of a perpendicular velocity component, so that the used paper pieces strike against slant faces 14a of constituent teeth 14b of the undulating teeth 14 and are disintegrated thereby (this way of disintegration will hereinafter be referred to as "pneumatic beating" in contrast with the conventional mechanical disintegration, as mentioned previously).

Used paper is a flexible material and can be bent easily. Even if such a flexible material is brought into strong collision with the undulating teeth 14 of the wall surface 1, the collided portion thereof will bend and absorb the resulting shock. However, when used paper as such a flexible material is conveyed pneumatically at a speed exceeding a certain level, it comes to have a very high rigidity during such pneumatic conveyance. That is, the used paper pieces M being conveyed pneumatically can be regarded not as a flexible material but as a material having high rigidity. For this reason, upon collision of each used paper piece M with the a slant face 14a of each tooth 14, a large impact force is transmitted throughout the whole of the used paper piece. When this impact force becomes larger than the bonding force which joins the fibers of the used paper piece M, the used paper piece is disintegrated into long fibers, as shown in the middle and lower stages of FIGS. 4(a)–4(c). According to the results of actual observation using an ultra-high speed photographing device, in the state shown in the middle stage of FIG. 4(b), even the portion of the used paper piece M which portion overlies the directly collided position with the slant face 14a of the tooth 14b and which itself has not directly collided therewith is disintegrated at the same time. The pulp fibers of used paper are bonded together using paste or the like and the force of this bonding is referred to herein as "bonding force."

In order that long pulp fibers may be obtained after disintegration, as mentioned above, it is necessary that a corner edge of each used paper piece M should come into collision with a slant face 14a of each constituent tooth 14b of the undulating teeth 14 in such a state as shown in FIGS. 4(a)–4(c) and that at this moment the used paper piece should have a high rigidity. In other words, if a face of the used paper piece M comes into collision with a slant face 14a of the tooth 14b, the resulting impact force will be dispensed over the wide impact face. For this reason, if a corner edge of each used paper piece M is brought into collision with such slant face, the disintegration efficiency will be improved because of a concentrated impact force. In this case, by cutting used paper finely in advance, which cutting may be done into square or rectangular shape for convenience' sake but may be even in indefinite shape, the thus finely cut paper pieces M will get on the air current during pneumatic conveyance and thereby maintains parallel to the flowing direction of the air current while a corner edge thereof faces the advancing direction of the air current.

Further, for imparting a high rigidity to each used paper piece M, it is necessary that the velocity of the air current which carries the used paper piece be set at a certain level or higher. Besides, by increasing the velocity of the air current it is made possible to obtain a large impact force upon collision of the used paper piece M with a slant face 14a of the tooth 14b. In this connection, the present inventors have conducted various experiments. As a result, it turned out that in the case of used paper of mechanical pulp having a relatively small bonding force, an air current velocity of 40 m or more (preferably 50 m or more) per second would do, while in the case of used paper of chemical pulp having a relatively large bonding force, an air current velocity of 60 m or more (preferably 80 m or more) per second was sufficient. At such an air current velocity, larger flow path R and larger velocity component in the parallel direction were effective, but when the air current velocity exceeded 120 m per second, there occurred a marked turbulent flow of the air current in the gas flow path, resulting in increased pressure loss, and it became necessary to use an air current generating power source of a large consumption energy exceeding the practical use level.

According to the apparatus for dry disintegration of used paper in the third, fourth and twentieth aspects of the present invention, the clearance distance L0 between the outer peripheral edge of a disc of an impeller comprising the disc and plural blades formed radially on one end face of the disc and each addendum tip of undulating teeth of a circular casing body is set at a value not less than ten times the thickness of each finely cut piece of used paper, the ratio (L0/W) of the said clearance distance L0 to the width W of each blade in the direction parallel to the rotational axis of the impeller is set at a value not larger than 0.3, and the peripheral speed of the impeller is set at a value not smaller than 40 m. Therefore, such mechanical disintegration as the used paper pieces being pulled and torn by both undulating teeth and impeller or being ground down is avoided to an almost complete extent and it is possible to disintegrate finely cut pieces of used paper into long pulp fibers.

Besides, since the ratio (L0/W) of the clearance distance L0 to the width W of each blade in the direction parallel to the rotational axis of the impeller is set at a value not larger than 0.3, it is possible to prevent almost completely the used paper pieces from passing as they are through the clearance formed between the undulating teeth of the circular casing and the impeller and being discharged in an undisintegrated state. At a small value of the clearance distance L0, the number of times of collision of the used paper pieces with the undulating teeth increases and the residence time of the used paper pieces in the clearance becomes longer, while at a large value of the clearance distance L0, the number of times of collision of the used paper pieces with the undulating teeth decreases and the used paper pieces may pass through the clearance without collision with the undulating teeth even once. The residence time of the used paper pieces in the clearance is also related to the value of the blade width W in the direction parallel to the rotational axis of the impeller. In view of this point, tests have been conducted while varying this relation. As a result, it was made sure that at the above ratio the disintegration could be done to a nearly satisfactory extent.

Further, in the dry disintegration apparatus in question, since the disc of the impeller is mounted on the driving shaft of a drive motor so as to be positioned on the drive motor side, the used paper pieces, with rotation of the impeller 20, flows together with the air current into the casing body through the inlet port in the axial direction (indicated by arrow P1 in FIG. 2) of the driving shaft, then strike against the disc of the impeller, change their moving direction, move radially (indicated by arrows P2 and P2a in FIG. 2) of the impeller along the blades and are conducted into the clearance formed between the impeller and the undulating teeth, then are moved circumferentially through the clearance while striking against the undulating teeth. During this movement, the disintegration of the used paper pieces proceeds gradually in the clearance. Thus, the disc of the impeller plays the role of changing the advancing direction of the used paper pieces and causing both air current and used paper pieces to flow toward the outlet port while rotating through the clearance.

When the impact force created upon collision of the used paper pieces with the undulating teeth is to be enhanced by increasing the velocity of the air current, this can be attained by increasing the rotating speed of the impeller. The air current velocity can be made constant easily by merely increasing the rotating speed of the impeller, but in order to adjust the conveyance speed of the used paper pieces conveyed by the air current to a predetermined speed, a relatively long approach-run distance is needed because the conveyance of the used paper pieces is started from zero speed. Such approach-run distance can be ensured in the case of a large-sized disintegration apparatus, but in the case of a disintegration apparatus of a practical use size it is difficult to ensure such approach-run distance. Moreover, with increase in the rotating speed of the impeller, the amount of air ted increases and hence the velocity of the air current passing through the interior of the circular casing body increase, so that the used paper pieces pass through the casing body in a short time and positive collision of the paper pieces with the undulating teeth sometimes cannot be ensured. In the apparatus according to the present invention, therefore, the disc of the impeller is mounted to the driving shaft of a drive motor so as to be positioned on the drive motor side and an outlet port is formed on the back side of the disc. Consequently, the amount of air to be fed can be suitably controlled even when the rotating speed of the impeller is increased, and hence the used paper pieces can be rotated many times through the clearance formed between the impeller and the undulating teeth, whereby a sufficient residence time of the used paper pieces in the clearance can be ensured and positive collision of the used paper pieces with the undulating teeth is ensured even in a small-sized disintegration apparatus.

In the case of using a single impeller, as indicated by arrow P2a in FIG. 2, the used paper pieces passing on the side closest to the disc of that impeller may pass in a short time through the clearance formed between the impeller and the undulating teeth and be discharged in an undisintegrated state from the outlet port of the circular casing body.

In view of the above point, according to the apparatus for dry disintegration in the eleventh aspect of the present invention, a plurality of impellers are mounted on the driving shaft of a drive motor, so the used paper pieces which have passed in an undisintegrated state through the clearance formed between the first-stage of the impeller and the undulating teeth can again be given a chance of striking against the undulating teeth in the presence of the second stage or the second and subsequent stages of the impellers. Thus, not only the used paper pieces can be disintegrated into long pulp fibers but also the disintegration of used paper can be done at a high percent disintegration with great decrease in the amount of undisintegrated paper.

In the apparatus for dry disintegration of used paper according to the present invention of the type wherein each impeller blade is short radially of the impeller and long axially of the impeller, that is, the apparatus using a silocco fan type impeller, there can be obtained the largest amounts of air current and pressure under the condition that the impeller diameter and rotating speed are the same, with the result that the impact force induced upon collision of used paper pieces with the undulating teeth can be made stronger and therefore it is possible to obtain disintegrated pulp fibers larger in length.

In the apparatus for dry disintegration of used paper according to the present invention of the type wherein the outer peripheral end side of each impeller blade is curved in the rotating direction of the impeller, that is, the impeller blades are forwardly facing blades, the impact force upon collision of the used paper pieces with the undulating teeth can be made stronger and disintegrated pulp fibers larger in length are sure to be obtainable even in the case of used paper of chemical pulp having a relatively high paper toughness.

In the apparatus for dry disintegration of used paper according to the present invention of the type wherein the outer peripheral end side of each impeller blade is curved in the direction opposite to the rotating direction of the impeller, that is, the impeller blades are backwardly facing blades, it is possible to effect disintegration into long pulp fibers with reduced consumption of the motor power in the case of used paper of mechanical pulp having a relatively low paper toughness.

In the apparatus for dry disintegration of used paper according to the present invention of the type wherein each impeller blade is the backwardly facing blade referred to above and a gap for the passage of air current is formed in the blade in a position close to the outer peripheral end of the blade so as to provide communication between the convex side (the side facing the rotating direction) and the concave side (the side facing the opposite direction) of the blade, it is possible to prevent fluffy disintegrated fibers from being deposited on the impeller blades and hence the occurrence of imbalance in the rotation of the impeller caused by the deposition of such disintegrated fibers is avoided, whereby it is made possible to prevent mechanical disintegration of used paper. If there occurs imbalance in the impeller's rotation, the foregoing clearance distance L0 will vary and the used paper will be disintegrated mechanically into short pulp fibers.

In the apparatus for dry disintegration of used paper according to the present invention, it is optional whether the outer peripheral ends of the impeller blades are projecting radially outwards from the outer peripheral edge of the disc or their outer peripheral end positions are in registration with the peripheral edge of the disc.

According to the apparatus for dry disintegration of used paper in the eighteenth aspect of the present invention, since a compressed injection hole is formed in the circular casing body for removing used paper pieces and disintegrated fibers deposited on the impeller blades, it is possible to prevent used paper pieces and disintegrated fibers from being deposited in a large quantity on the impeller blades with the lapse of time. Consequently, it is possible to prevent the occurrence of imbalance in the rotation of the impeller which is caused by such deposition, and hence possible to prevent mechanical disintegration of the starting used paper.

According to the apparatus for dry disintegration of used paper in the nineteenth aspect of the present invention, since a used paper suction nozzle having a hollow chamber and connected to the inlet port of the circular casing body is provided, a nearly mount of used paper can always be introduced into the circular casing body even in the even of slight increase or decrease in the amount of used paper fed to the used paper suction nozzle, that is, there is no fear of temporary sudden increase in the amount of used paper fed into the casing body, thus making it possible to minimize the amount of undisintegrated used paper.

DETAILED DESCRIPTION OF THE PREFERRED EMBODIMENTS

Figure 1:
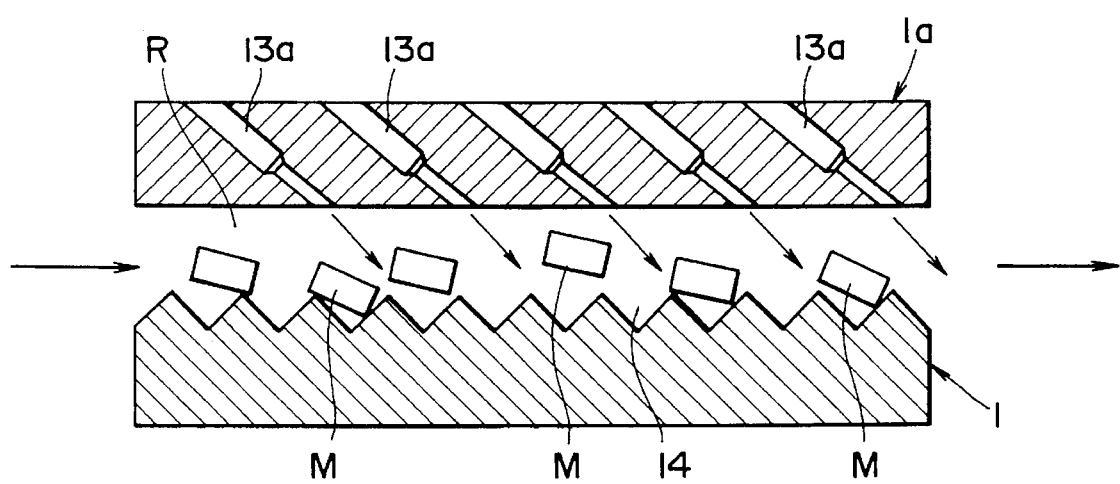
FIG. 1 is a vertical sectional view showing an example of an apparatus for dry disintegration of used paper to be used for practicing the method of the present invention.

Embodiments of the present invention will be described hereinunder with reference to the accompanying drawings. FIG. 1 is a vertical sectional view showing an example of an apparatus for dry disintegration of used paper to be used for practicing the method of the present invention. According to the method for dry disintegration of used paper in the present invention, a wall 1 of an undulating section is formed on the inner side of a gas flow path R, a current of air having a velocity component parallel to the wall 1 and also having a velocity component perpendicular to and striking against the wall 1 is allowed to flow through the gas flow path R, and finely divided used paper pieces M are allowed to pass through the path R together with the air current.

As shown in FIG. 1, the gas flow path R is defined by a pair of walls 1 and 1a, and undulating teeth 14 having an undulating section are formed on the inner surface of the wall 1 located on the lower side in FIG. 1.

In this embodiment, each tooth of the undulating teeth 14 is has a sectional shape of a regular triangle 3 mm in one side. Although the shape of the undulating teeth 14 is sawtooth-like in FIG. 1, modification may be made into, for example, a rectangular or sine wave shape.

In the wall 1a, which is located on the upper side in FIG. 1, there are formed a plurality of nozzles 13a at predetermined intervals for ejecting air currents obliquely downwards. The air current from each nozzle 13a has a velocity component parallel to the wall 1 in the gas flow path R (a velocity component advancing from the left to the right in FIG. 1) and a velocity component perpendicular to and striking against the wall 1 (a velocity component advancing downward in FIG. 1), and flows from the left to the right side in FIG. 1. The length of each of the walls 1 and 1a in the left to the right direction in FIG. 1 is set actually at, say, 3 m or so.

Although in the apparatus illustrated in FIG. 1, the undulating teeth 14 are formed on the inner surface of the lower wall 1 throughout the gas flow path, the undulating teeth 14 may be formed intermittently on the inner surface of the wall 1 to provide both undulating teeth 14 portion and planar portion. In this case, the said planar portion functions as an approach-run portion so that the used paper pieces M can obtain a sufficient moving speed for their next collision with the undulating teeth 14.

Although the apparatus shown in FIG. 1 is constructed so as to eject air currents from only the nozzles 13a, if a larger power is required for setting a large parallel velocity component of air current flowing through the gas flow path R, a current of air may be fed under pressure into the flow path R from the left-hand side in FIG. 1, or the air current inside the flow path R may be sucked by negative pressure from the right-hand side in the same figure, in addition to the air current ejection from the nozzles 13a.

In the method for dry disintegration of used paper according to the present invention, finely cut used paper pieces M are allowed to pass through the flow path R together with the air current.

Figure 18:
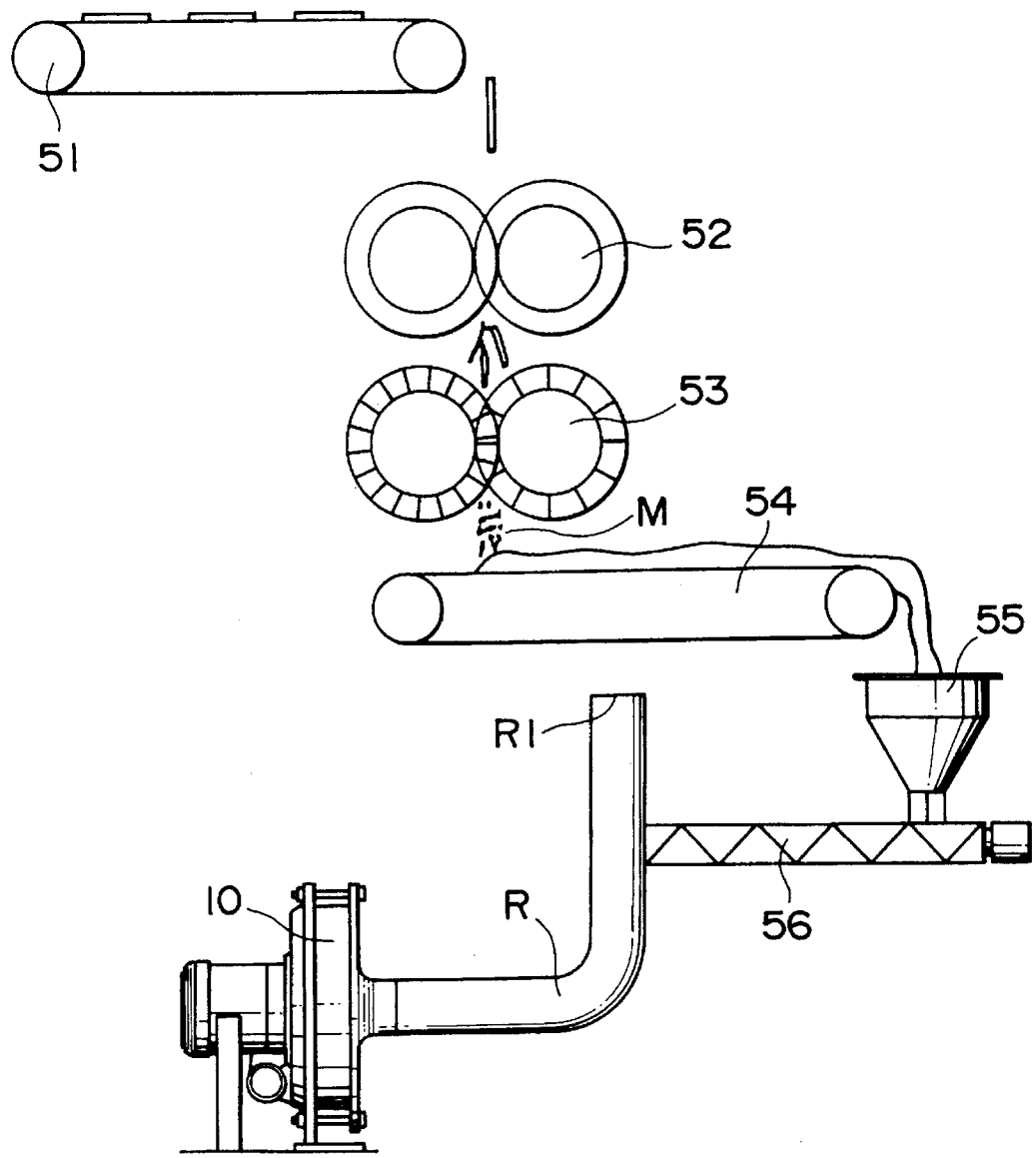
FIG. 18 is a side view showing a connected state of attachments to a used paper dry disintegration apparatus according to the present invention.
Figure 19:
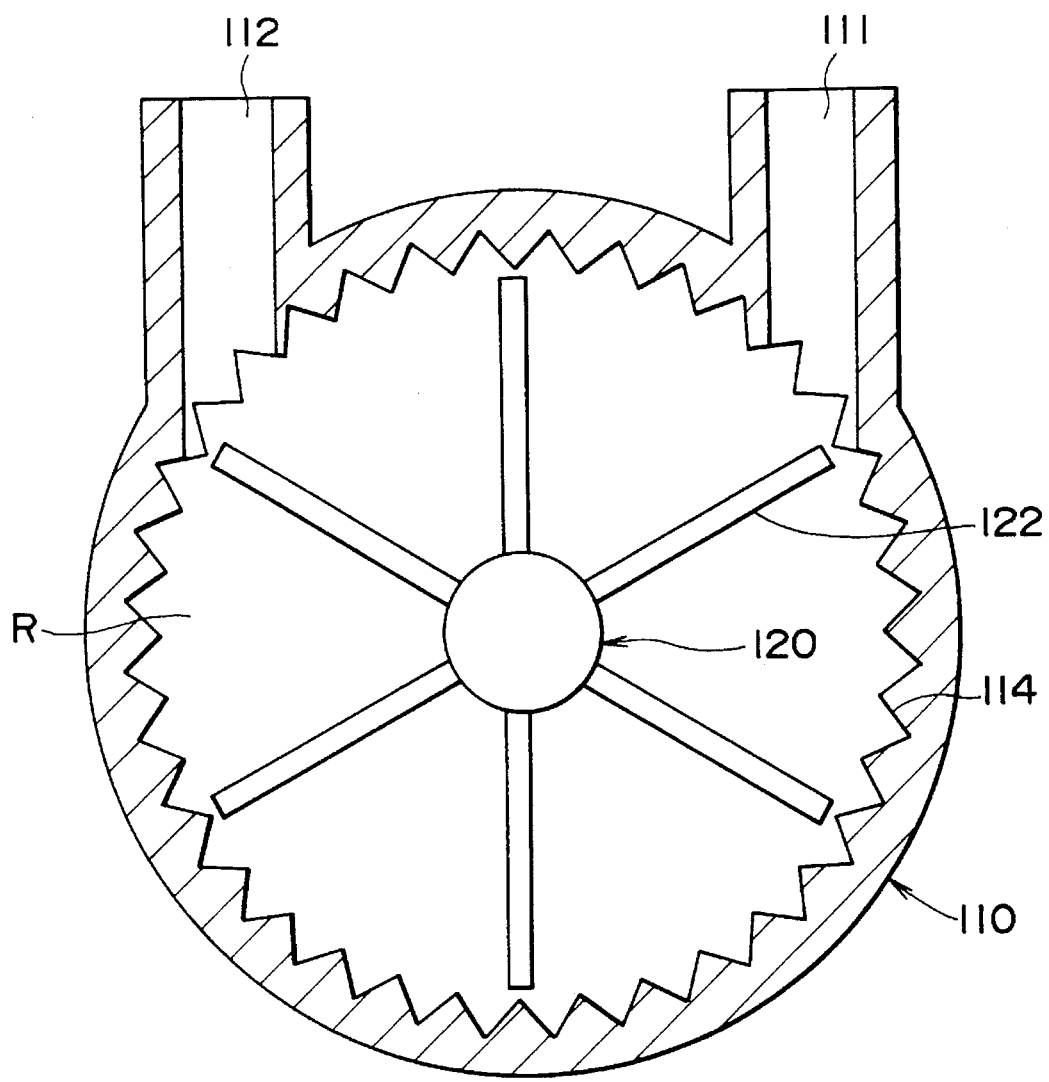
FIG. 19 is a vertical sectional view of a principal portion of a conventional apparatus.
Figure 20:
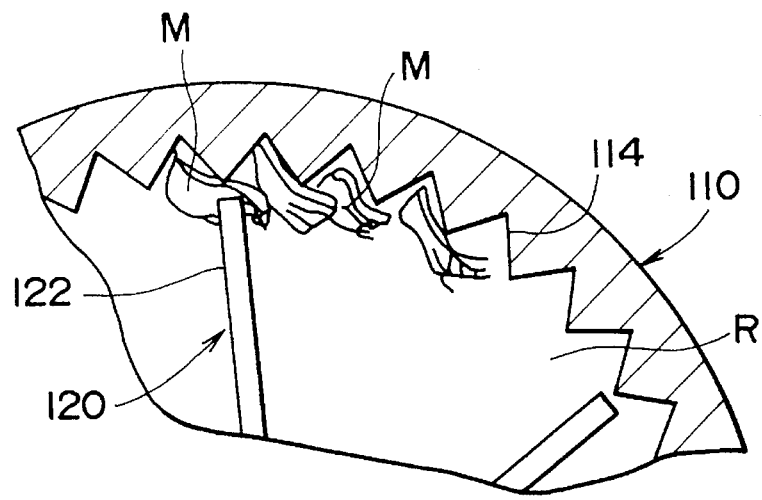
FIG. 20 is a diagram for explaining a disintegration principle in the conventional apparatus.
Figure 21:
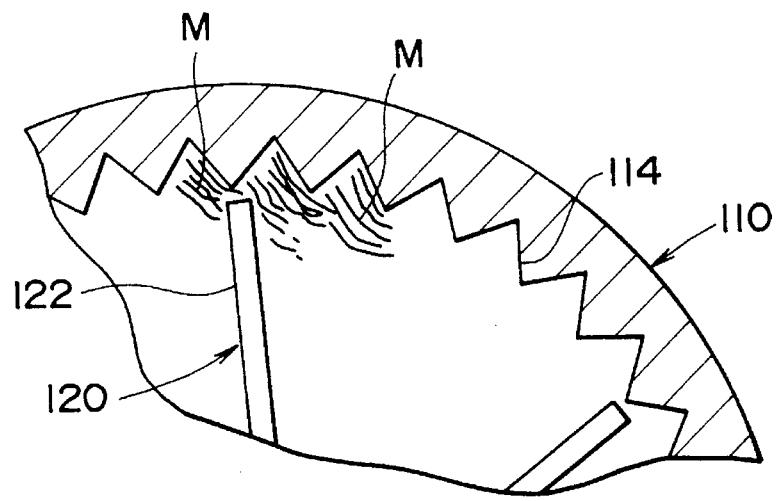
FIG. 21 is a diagram similar to FIG. 20.

Such finely cut used paper pieces can be obtained by cutting recovered used paper with a known cutter. FIG. 18 is a side view showing a connected state of attachments to the used paper dry disintegration apparatus according to the present invention. For example, as shown in the same figure, used paper which has been conveyed by means of a conveyor 51 is cut into strips with a slither 52, which strips are then cut into rectangular pieces with a drum cutter 53. The thus-cut used paper pieces employed in this embodiment each had a size of 2×6 mm or 3×12 mm (the difference in the size of the used paper pieces M caused little difference in the disintegration efficiency).

The thus finely cut pieces of used paper M are then conducted together with a current of air into the gas flow path by utilizing the conventional pneumatic conveyance method. More specifically, as shown in FIG. 18, the finely cut used paper pieces M leaving the drum cutter 53 are conveyed to a hopper 55 by means of a conveyor 54 and are then fed successively into the flow path R by means of a feeder 56 which provide connection between the hopper 55 and the flow path R. One end side of the flow path R is open as opening R1 into the atmosphere.

During such pneumatic conveyance, the used paper pieces M being conveyed pneumatically through the gas flow path R are pushed against the undulating teeth 14 of the wall 1 by virtue of the velocity component of the air current perpendicular to the wall 1, so that the used paper pieces successively strike against slant faces 14a of constituent teeth 14b of the undulating teeth 14 and are disintegrated thereby. At this time, the force applied to the used paper pieces M is only the impact force induced upon collision of the used paper pieces with the slant faces 14a, and no mechanical disintegration force, e.g. tearing force acting to tear each used paper piece from both sides, is exerted on the paper pieces. For this reason, the possibility of the constituent pulp fibers of the used paper pieces M being torn to fine pieces is reduced effectively.

unless the above impact force is of a predetermined magnitude or stronger, the used paper pieces M will not be disintegrated. This requirement can be attained by increasing the velocity of the air current. As specified in the disintegration method in the foregoing second aspect of the invention, an almost satisfactory result of disintegration was obtained at an air current velocity set at a value of not lower than 40 m per second. Effective disintegration can be done at an air current velocity of 40 m or more per second in the case of used paper of mechanical pulp and 50 m or more in the case of used paper of chemical pulp.

Figure 4A:
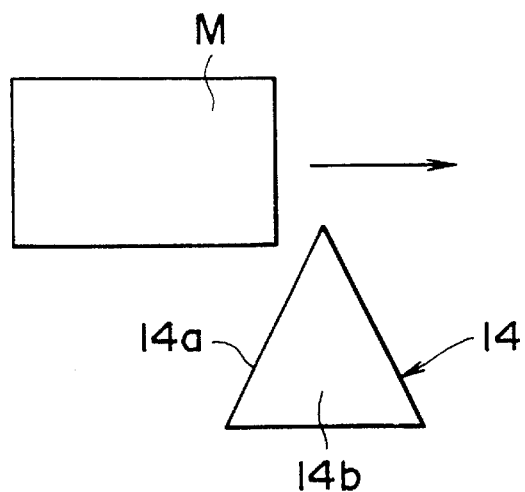
FIGS. 4(a), 4(b) and 4(c) illustrate is a diagram for explaining the disintegration principle in the present invention.
Figure 4B:
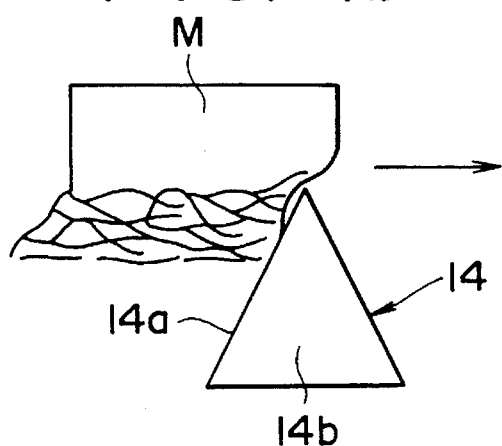
Figure 4C:
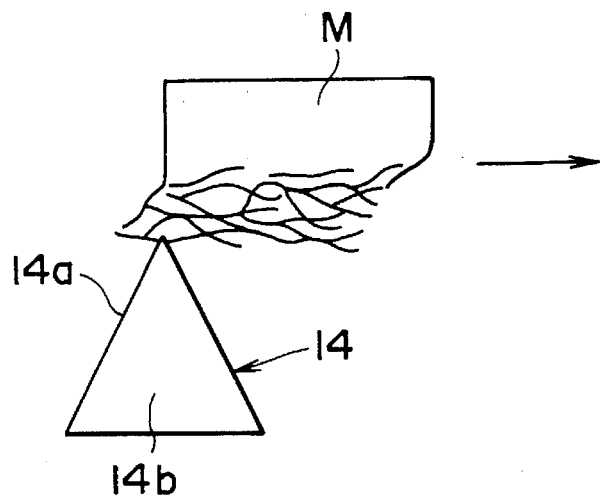

When the used paper M cut finely in a rectangular shape is conveyed pneumatically together with a current of air flowing at a velocity of 40 m or more per second, a corner edge of each used paper piece M strikes against a slant face 14a of a constituent tooth 14b of the undulating teeth 14, as shown in FIG. 4. At this time, the force acting to bend the used paper pieces is suppressed by the air current flowing at high velocity, so that the impact force resulting from the collision is transmitted surely to the whole of the constituent fibers of the used paper piece, whereby the used paper piece is disintegrated into pulp fibers.

Figure 2:
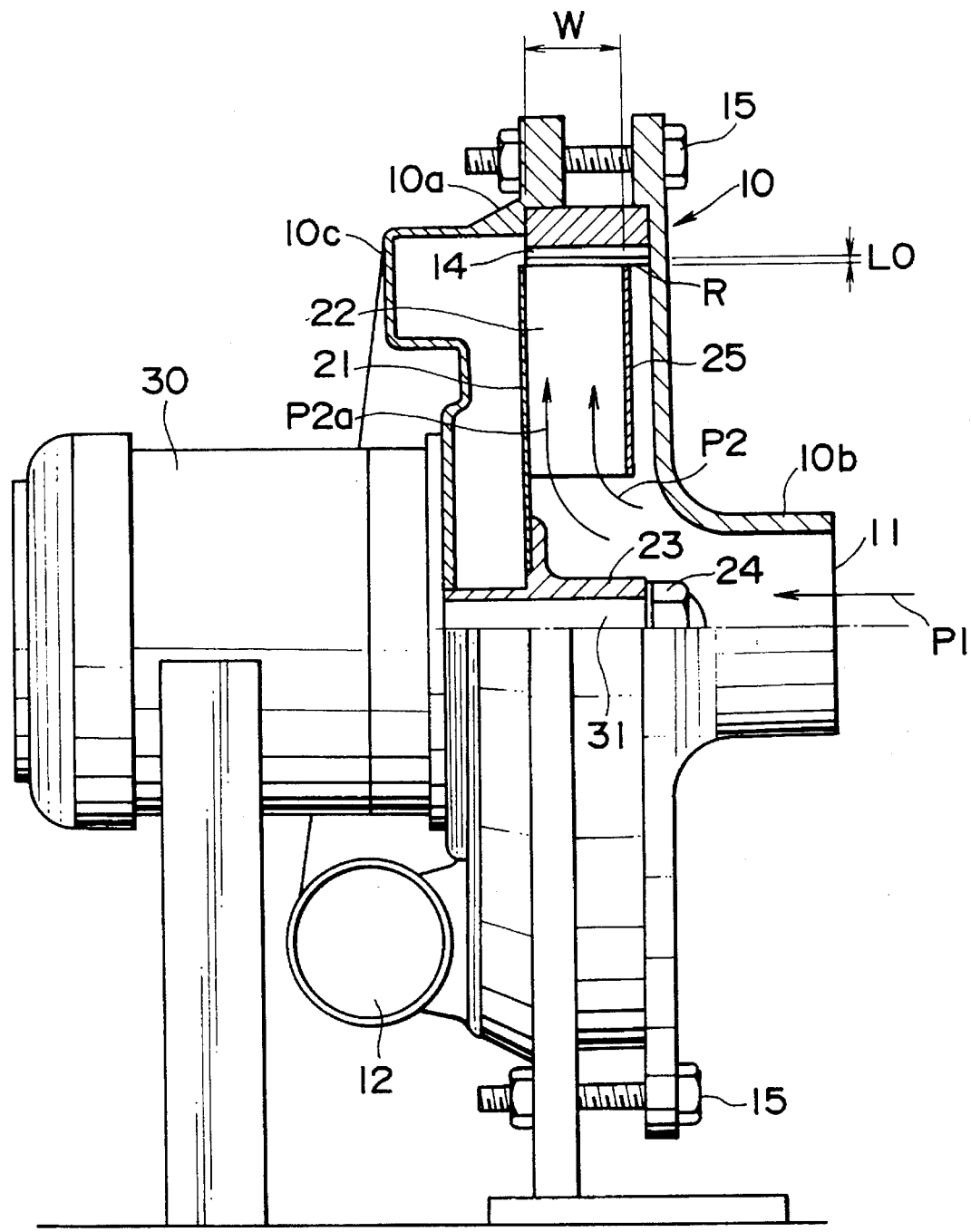
FIG. 2 is a partially sectional side view showing another example of an apparatus for dry disintegration of used paper according to the present invention.

Next, reference will be made below to a disintegration apparatus according to the present invention wherein the gas flow path R described above as a linear path is substituted by a circular one. FIG. 2 is a partially sectional side view showing another example of an apparatus for dry disintegration of used paper according to the present invention, and FIG. 3 is a front view showing undulating teeth of a circular casing illustrated in FIG. 2 and also showing an impeller.

The apparatus for dry disintegration of used paper according to the present invention illustrated in FIG. 2 is provided with a circular casing body 10, an impeller 20 mounted coaxially within the circular casing body 10, and a drive motor 30. The circular casing body 10 has an inlet port 11 for sucking in finely cut used paper pieces M together with a current of air, an outlet port 12 for discharging disintegrated fibers together with the air current, and undulating teeth 14 of an undulating section formed circumferentially on the inner peripheral surface of the casing body. The impeller 20 comprises a disc 21 and a plurality of blades formed radially on one end face of the disc 21. The drive motor 30 causes the impeller 20 to rotate, thereby sucking in the finely cut used paper pieces M together with the air current from the inlet port 11 and allowing them to pass through a clearance formed between the undulating teeth 14 and the impeller 20. The clearance distance L0 between the outer peripheral edge of the disc 21 of the impeller 20 and each addendum tip of the undulating teeth 14 is set at a value not less than ten times the thickness of each used paper piece M, the ratio (L0/W) of the clearance distance L0 to the width W of each blade 22 in the direction parallel to the rotational axis of the impeller is set at a value not larger than 0.3, and the peripheral speed of the impeller 20 is set at a value not smaller than 40 m per second.

Figure 3:
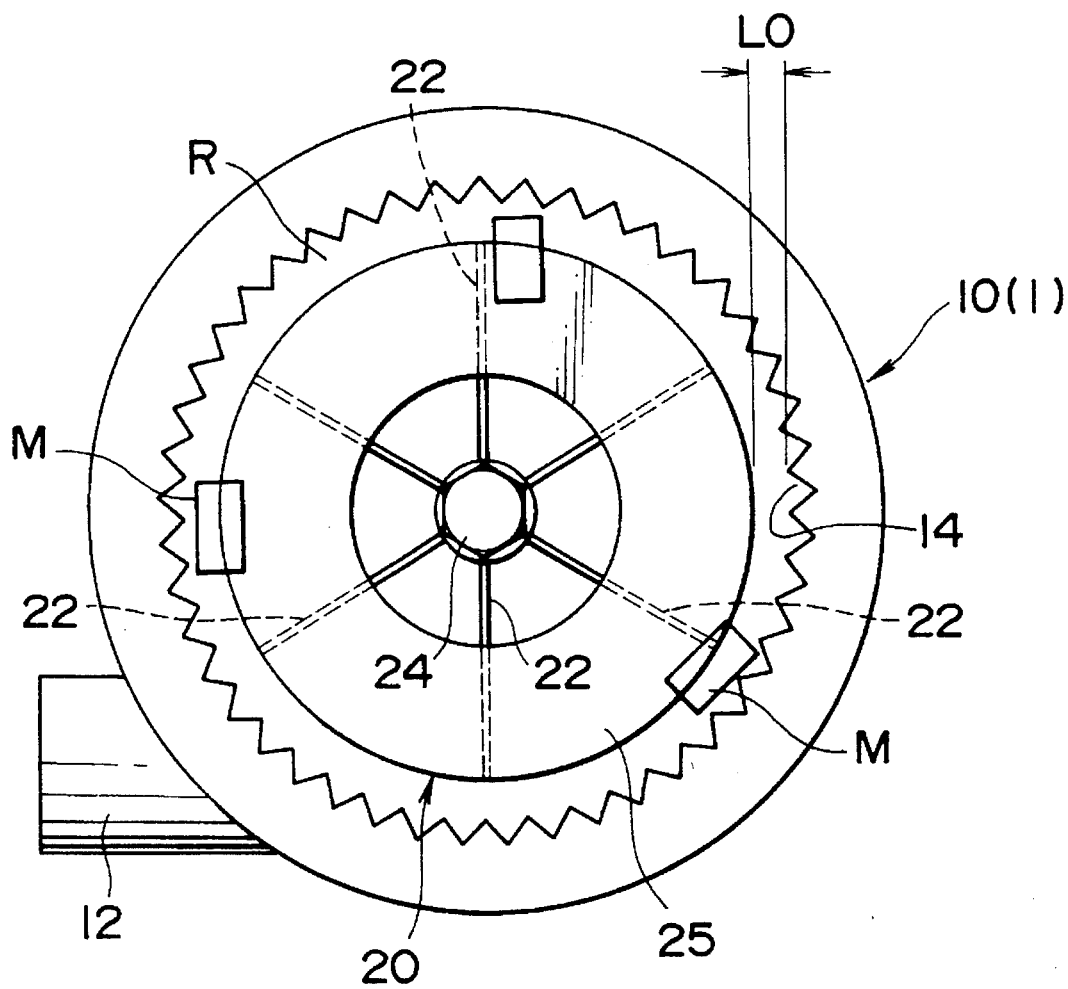
FIG. 3 is a front view showing undulating teeth of a circular casing body and an impeller in the apparatus of FIG. 2.

In this dry disintegration apparatus, as shown in FIGS. 2 and 3, upon rotation of the impeller 20 there is generated in the clearance formed between the undulating teeth 14 of the circular casing body 10 and the impeller 20 a current of air having a velocity component parallel to the circular casing body 10 which corresponds to the foregoing wall 1 (a velocity component in the circumferential direction of the circular casing body), a velocity component perpendicular to and striking against the circular casing body 10 corresponding to the wall 1 (a velocity component in the radial direction of the impeller) and a velocity component parallel to the axial direction of the circular casing body and advancing toward the outlet port 12 side (a velocity component in the rotational axis direction of the impeller).

The circular casing body 10 comprises a body member 10a having the undulating teeth 14 of an undulating section formed circumferentially on the inner peripheral surface thereof, a cover member 10b having the inlet port 11 and a blast casing member 10c having the outlet port 12. The body member 10a is held grippingly between the cover member 10b and the blast casing member 10c, and in this state the three members are clamped and fixed with plural bolts 15.

The reason why the clearance distance L0 between the outer peripheral edge of the disc 21 and each addendum tip of the undulating teeth 14 is set at a value not less than ten times the thickness of each used paper piece M is that it is intended to avoid as far as possible the used paper piece being torn to fine pieces or ground down. According to the results of observation, since the clearance distance L0 is so set, even when a used paper piece M is caught by a constituent tooth of the undulating teeth 14, it can leave the tooth easily because the air current is slow in the vicinity of the undulating teeth 14 and a turbulent flow is present. Consequently, there is little recognized the phenomenon that the used paper piece M is pulled by both the tooth and the impeller 20 and is thereby disintegrated mechanically, nor has scarcely been recognized the phenomenon of the used paper pieces M being torn to fine pieces or ground down.

In the apparatus in question, moreover, the ratio (L0/W) of the clearance distance L0 to the width W of each blade 22 in the direction parallel to the rotational axis of the impeller 20 is set at 0.3 or less, and the peripheral speed of the impeller 20 is set at 40 m or more per second.

According to the results of experiment, by setting the above ratio (L0/W) at 0.3 or less, the used paper pieces M can be prevented almost completely from passing in an undisintegrated state through the clearance formed between the undulating teeth 14 and the impeller 20. The reason why the peripheral speed of the impeller 20 is set at 40 m or more per second is because it is intended to obtain a velocity of 40 m or more per second as the velocity component of the air current parallel to the undulating teeth 14.

In this embodiment, the sectional shape of each tooth of the undulating teeth 14 formed in the circular casing body 10 is in the shape of a regular triangle 3 mm in one side, like that in FIG. 1.

As shown in FIG. 2, the drive motor 30 for rotating the impeller 20 is mounted to one end face of the circular casing body 10 in such a manner that a driving shaft 31 thereof is inserted into the casing body in axial alignment with each other. On the driving shaft thus inserted into the casing body 10 is mounted the impeller 20 so that its disc 21 is positioned on the drive motor 30 side.

The inlet port 11 for sucking in the finely cut used paper pieces M together with the air current is open centrally of the opposite end face of the circular casing body 10, as shown in FIG. 2. The outlet port 12 for discharging the disintegrated fibers together with the air current is open tangentially of the peripheral surface of the casing body 10 in a position closer the drive motor 30 relative to the disc 21. A rotating current created within the circular casing body 10 upon rotation of the impeller 20 goes out from the outlet port 12 and an air current is sucked in from the inlet port 11 at a flow rate corresponding to the outflow rate, both in a successive manner. Thus, in this embodiment, an air current is sucked in axially of the impeller 20 and is discharged in the tangential direction.

The impeller 20 is composed of the disc 21 and plural blades 22 formed radially on one end face of the disc 21. In this embodiment, the outer peripheral end of each blade 22 of the impeller 20 is in registration with the outer peripheral edge of the disc 21. As shown in FIG. 2, the impeller 20 is mounted on the driving shaft 31 in such a manner that its disc 21 is positioned at the boundary between the body member 10a and the blast casing member 10c. By positioning the impeller 20 within the body member 10a formed with the undulating teeth 14 and by opening the outlet port 12 tangentially of the peripheral surface of the circular casing body 10 in a position closer to the drive motor 30 and relative to the disc 21 of the impeller 20, a rotating current created upon rotation of the impeller 20, mainly within the body member 10a, flows into the blast casing member 10c through the clearance between the disc 21 and the undulating teeth 14, then flows out from the outlet port 12. As a result, the number of times of moving around of the used paper pieces M through the clearance formed between the undulating teeth 14 and the impeller 20 increases, whereby the residence time of the used paper pieces M in the said clearance can be made longer.

Figure 5:
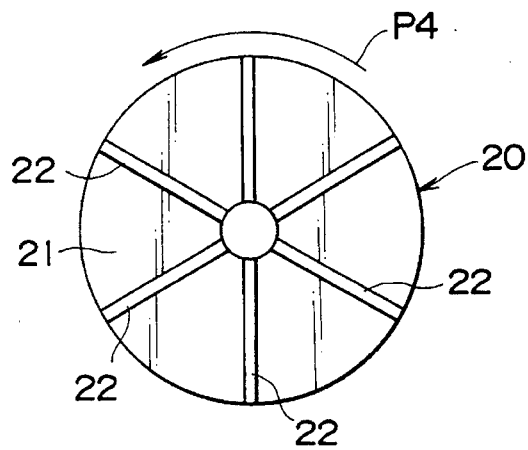
FIG. 5 is a front view of an impeller used in the apparatus of FIG. 2.
Figure 6:
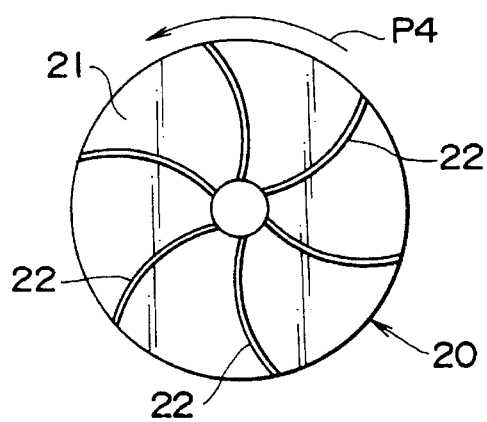
FIG. 6 is a front view showing another example of an impeller in the apparatus of FIG. 2.

In the apparatus illustrated in FIG. 2, a radially and linearly extending blade (radial blade) is adopted as each blade 22 of the impeller 20, as shown in FIG. 5. As each blade 22 of the impeller 22 it is optional whether there is to be adopted such radial blade, or a forward blade which is curved in the rotating direction P4 on the outer peripheral end side of the blade, as shown in FIG. 6, or a backward blade which is curved in the direction opposite to the rotating direction P4 on the outer peripheral end side of the blade. Among impeller having such radial blades, the on impeller having such a forward blades and the impeller having such a backward blades there exist the following relationships under the conditions of the same impeller diameter and same rotating speed:

Velocity component in the parallel direction (circumferential direction) of the absolute velocity of air current (velocity viewed from a static system):

Forward blade>Radial blade>Backward blade (1)

Absolute velocity of air current (velocity viewed from a static system, corresponding to the combination of the parallel velocity component and the perpendicular velocity component both referred to in the present invention):

Forward blade>Radial blade>Backward blade (2)

Thus, from the above relationship (1), the residence time of the used paper pieces M can be varied, and from the above relationship (2), the striking speed of the used paper pieces M with the undulating teeth 14 can be varied. That is, in the came of used paper of mechanical pulp having a relatively weak toughness, there should be adopted an impeller having backward blades, while in the case of used paper of chemical pulp having a relatively strong toughness, there should be adopted an impeller having forward blades, to let the used paper pieces M strike against the undulating teeth 14 at a sufficiently high velocity. Although such an adjustment can be made by adjusting the number of revolutions of the drive motor 30, it is effective in the case where there is a restriction placed on the number of revolutions of the motor 30. A hollow disc 25 for reinforcement is attached to the blades 22 of the impeller 20 on the side opposite to the disc side, as shown in FIGS. 2 and 3.

In the apparatus illustrated in FIG. 2, the impeller 20 is supported in a cantilevered manner using the drive shaft 31 of the drive motor 30. The impeller 20 is centrally provided with a sleeve portion 23 for insertion therein of the drive shaft 31. The sleeve portion 23 is keyed to the driving shaft 31, and the disc 21 is fixed to the sleeve portion 23. Further, a nut 24 for the prevention of dislodgement is tightened to the front end of the driving shaft 31.

As to the above cantilever method, the adoption thereof in the conventional apparatus has been considered impossible because of the following two points. As the first point, since in the conventional apparatus the clearance between the outer peripheral end of the impeller and the undulating teeth is set small, it has been impossible in the cantilever method to obtain such clearance with a high accuracy in the manufacture of the apparatus. As the second point, since used paper pieces are torn to fine pieces or ground down, a large force is imposed on the impeller and hence it has been impossible to ensure a sufficient strength in the cantilever method.

On the other hand, in the dry disintegration apparatus according to the present invention, since pneumatic beating is adopted in place of the conventional mechanical disintegration, the clearance distance L0 between the outer peripheral ends of the blades 22 of the impeller 20 and the addendum tips of the undulating teeth 14 can be set large and the used paper pieces are scarcely torn to fine pieces or ground down, so that an excessive force is not exerted On the impeller 20 and there can be attained sufficiently high accuracy and strength by the cantilever method. Besides, the construction of the apparatus is simple because the cantilever method is adopted.

Figure 8:
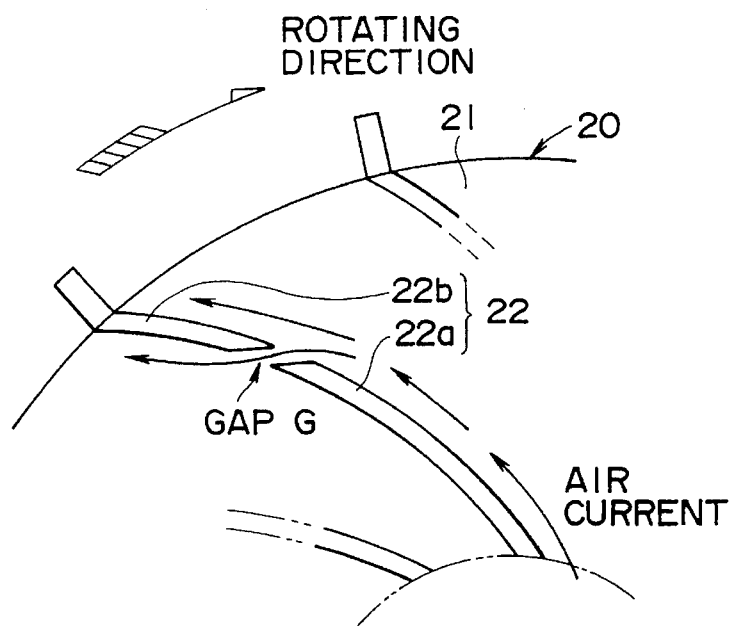
FIG. 8 is a front view of a principal portion showing a still further example of an impeller in the apparatus of FIG. 2.

FIG. 8 is a front view of a principal portion showing a still further example of the impeller used in the apparatus of FIG. 2. In the case where the impeller blades are backward blades, fluffy disintegrated fibers are deposited and gradually accumulated on the outer peripheral end of each backward blade and thereabouts on the concave side (the side opposite to the rotating direction side) of the blade. In the impeller 20 shown in FIG. 8, in order to prevent such deposition of disintegrated fibers on each backward blade, a gap G which provides communication between the convex side (the rotating direction side) and the concave side of each blade 22 for the passage of air current therethrough is formed in the blade in a position close to the outer peripheral end of the blade. As to the hollow disc 25, its illustration is omitted in FIG. 8.

Upon rotation of the impeller 20, as shown in FIG. 8, there is formed an air current flow path along which the air current passes through the gap G from the blade convex side and is conducted to the blade concave side which is lower in pressure than the convex side, then advances toward the outer peripheral end of the blade. By the air current flowing through the gap G it is made possible to prevent fluffy disintegrated fibers from being deposited on each blade 22 of the impeller 20. Since there does not occur imbalance in the rotation of the impeller 20 which imbalance is caused by the deposition of disintegrated fibers, it is possible to prevent the used paper pieces from being disintegrated mechanically.

Figure 9:
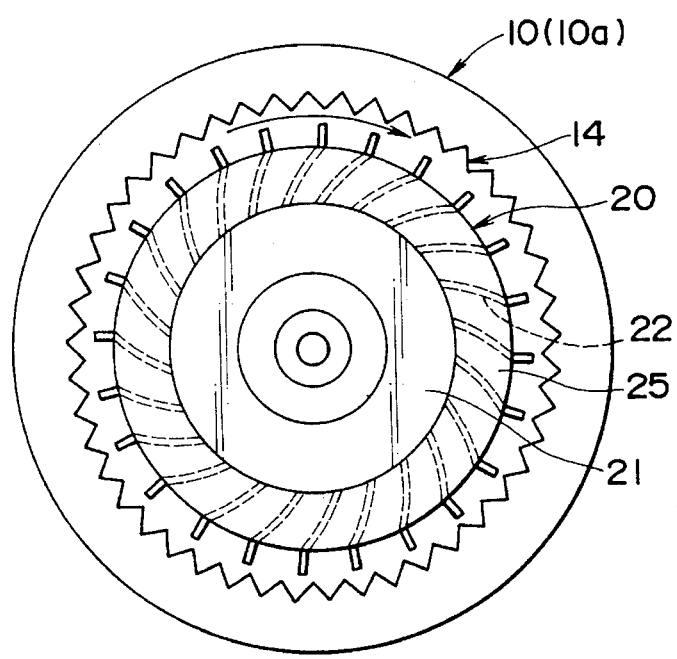
FIG. 9 is a front view showing a still further example of an impeller in the apparatus of FIG. 2.

FIG. 9 is a front view showing a still further example of the impeller used in the apparatus of FIG. 2. In FIG. 9, as the impeller there is used a silocco fan type impeller 20 having a large number of blades 22 which are short radially and long axially. By using such a silocco fan type impeller 20 there can be obtained the largest flow rate of air current and pressure under the conditions of the safe impeller diameter and same rotating speed, so that the impact force induced upon collision of used paper pieces with the undulating teeth can be increased and there are obtained longer pulp fibers after disintegration. The blades of the silocco fan type impeller 20 are forward blades, and in this example the outer peripheral ends of the blades 22 are projecting radially outwards from the outer peripheral edge of the disc 21.

Figure 10:
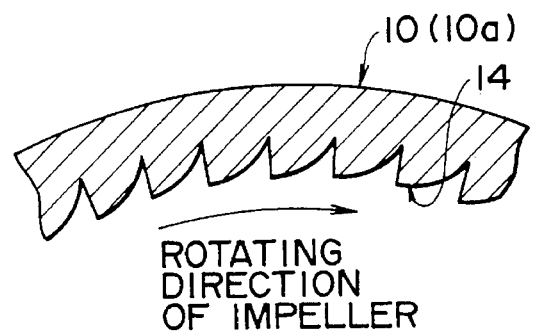
FIG. 10 is a sectional view of a principal portion showing another example of undulating teeth in the apparatus of FIG. 2.

FIG. 10 is a sectional view of a principal portion showing another example of undulating teeth used in the apparatus of FIG. 2. In each tooth of undulating teeth 14 formed in the inner peripheral surface of a cylindrical body member 10a, a circumferential sectional shape thereof is triangular and the rising angle of the side opposed to the impeller rotating direction is set perpendicularly or at an acute angle close to perpendicularity (perpendicular in FIG. 10). By using such undulating teeth 14, there can be obtained a large impact force upon collision of used paper pieces with the teeth 14 and it becomes easier to obtain long pulp fibers after disintegration.

Figure 11:
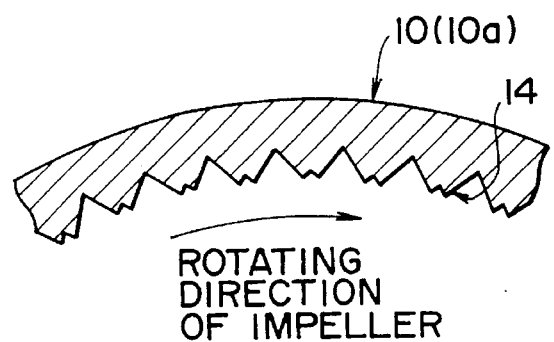
FIG. 11 is a sectional view of a principal portion showing a further example of undulating teeth in the apparatus of FIG. 2.

FIG. 11 is a sectional view of a principal portion showing a further example of the undulating teeth used in the apparatus of FIG. 2. According to this example, in each tooth of undulating teeth 14 formed on the inner peripheral surface of a cylindrical main body 10a, its circumferential sectional shape is triangular as a whole and the addendum portion has two sharp edges which are each triangular in section. According to such undulating teeth 14, since plural sharp edges are formed at each addendum portion, there can be obtained a large impact force upon collision of used paper pieces with the teeth 14 and it becomes easier to obtain long pulp fibers after disintegration.

Figure 12:
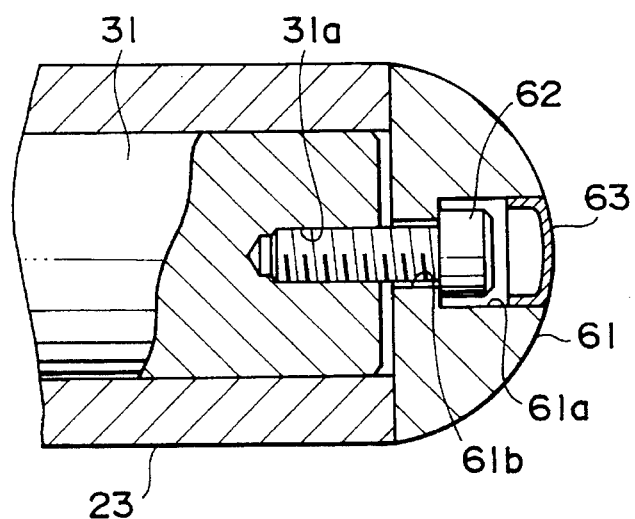
FIG. 12 is a sectional view showing another constructional example of a front end portion of a driving shaft used in the apparatus of FIG. 2.

FIG. 12 is a sectional view showing another constructional example of the front end portion of the driving shaft used in the apparatus of FIG. 2. In FIG. 12, the numeral 31 denotes a driving shaft of a drive motor 30 and numeral 23 denotes a sleeve portion to be fitted on the driving shaft 31. The sleeve portion 23, to which is mounted the disc 21 of the impeller 20 (not shown), is prevented from dislodgement by means of a conical portion 61 which will be described below.

The conical portion 61, whose maximum diameter is equal to the outside diameter of the sleeve portion 23, has a spherical portion. In the top part of the said spherical portion is formed a spot-faced part 61a, and a bolt hole 61b is formed so as to extend from the center of the bottom of the spot-faced part 61a through the planar side which side is in abutment with the sleeve portion 23. The conical portion 61 is fixed by bringing a bolt 62 into threaded engagement with internal threads 31a formed in the front end portion of the driving shaft 31, the bolt 62 extending through the bolt hole 61b from the opening side of the spot-faced part 61a. Further, a resin cap 63 having a spherical portion contiguous to the spherical portion of the cone 61 is fitted in the opening of the spot-faced part 61a.

Thus, since the conical portion 61 is attached to the front end of the sleeve portion 23, the used paper pieces which are sucked in together with a current of air from the inlet port 11 are not deposited on the front end of the sleeve portion 23. For this reason there will not occur imbalance in the rotation of the impeller 20 and therefore it is possible to prevent used paper pieces from being disintegrated mechanically.

Figure 13:
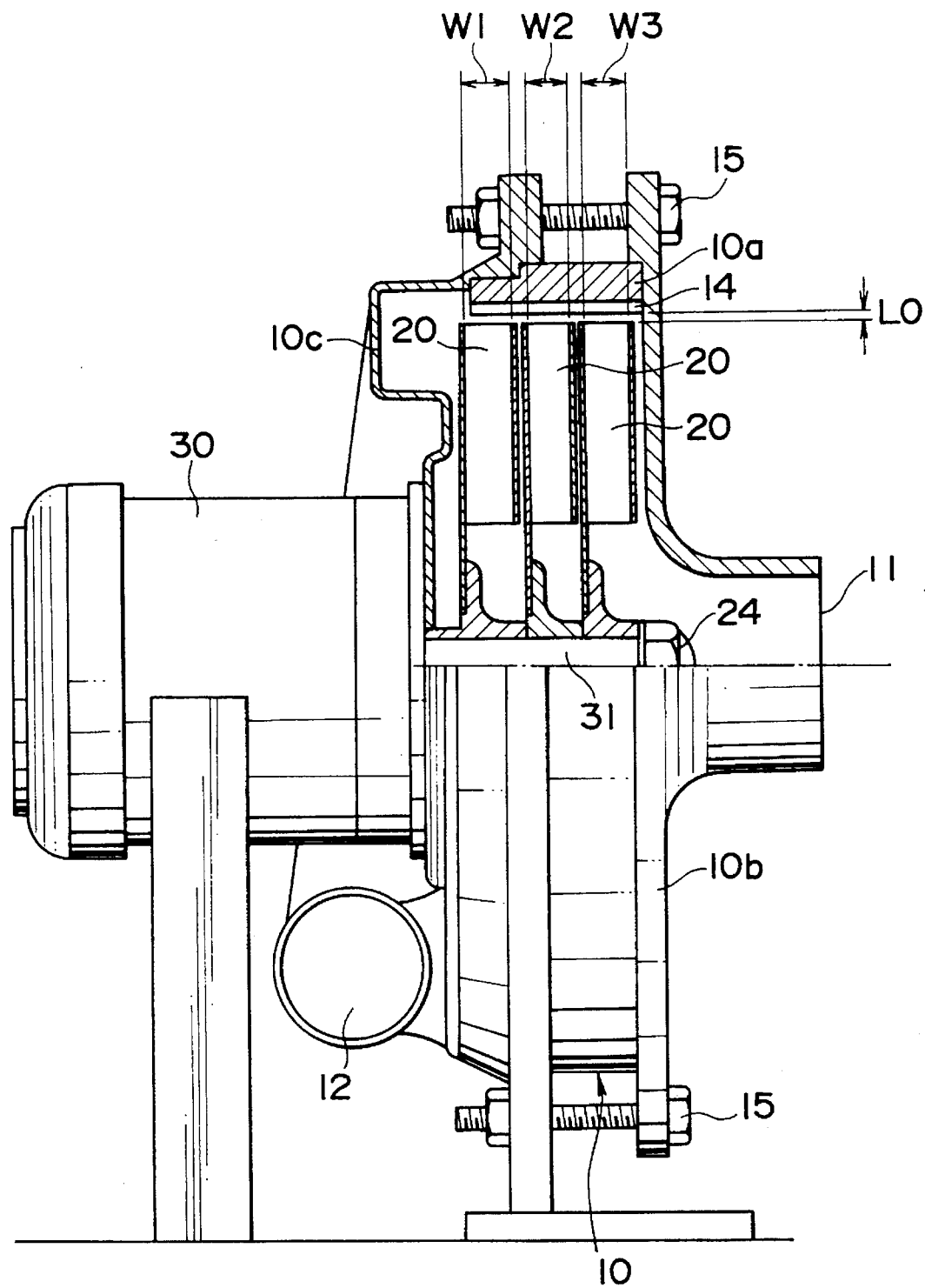
FIG. 13 is a partially sectional side view of an apparatus for dry disintegration of used paper according to a further embodiment of the present invention.

Description will now be directed to a dry disintegration apparatus having a plurality of impellers, with reference to FIG. 13. FIG. 13 is a partially sectional side view showing a still further example of an apparatus for dry disintegration of used paper according to the present invention. This apparatus is of the same construction as the apparatus illustrated in FIG. 2 except that plural (three in the illustrated example) impellers 20 are mounted onto driving shaft 31.

In the case of using one impeller, as noted previously, there sometimes occurs the case where, as indicated by arrow P2a in FIG. 2, used paper pieces flowing on the side closest to the disc of the impeller pass in a short time through the clearance formed between the undulating teeth 14 and the impeller and are discharged in an undisintegrated state from the outlet port 12 of the circular casing body 10. To prevent this inconvenience, a plurality of impellers 20 are mounted to the driving shaft 31. In the apparatus shown in FIG. 13, three separate impellers 20 are stacked in a multistage fashion and then mounted to the driving shaft 31, for convenience' sake in assembling and disassembling works. In place of mounting a plurality of separate impellers 20 onto the driving shaft 31, an integrally coupled block of plural discs 21 and blades formed between adjacent discs may be mounted onto the driving shaft 31.

According to the apparatus illustrated in FIG. 13, since three impellers 20 are mounted to the driving shaft 31, used paper pieces which have passed in an undisintegrated state through the clearance formed between the first-stage of impeller 20 and the undulating teeth 14 are again given a chance of striking against the teeth 14 in the presence of the second and third impellers to thereby prevent the undisintegrated used paper pieces from being discharged from the outlet port 12.

Figure 14:
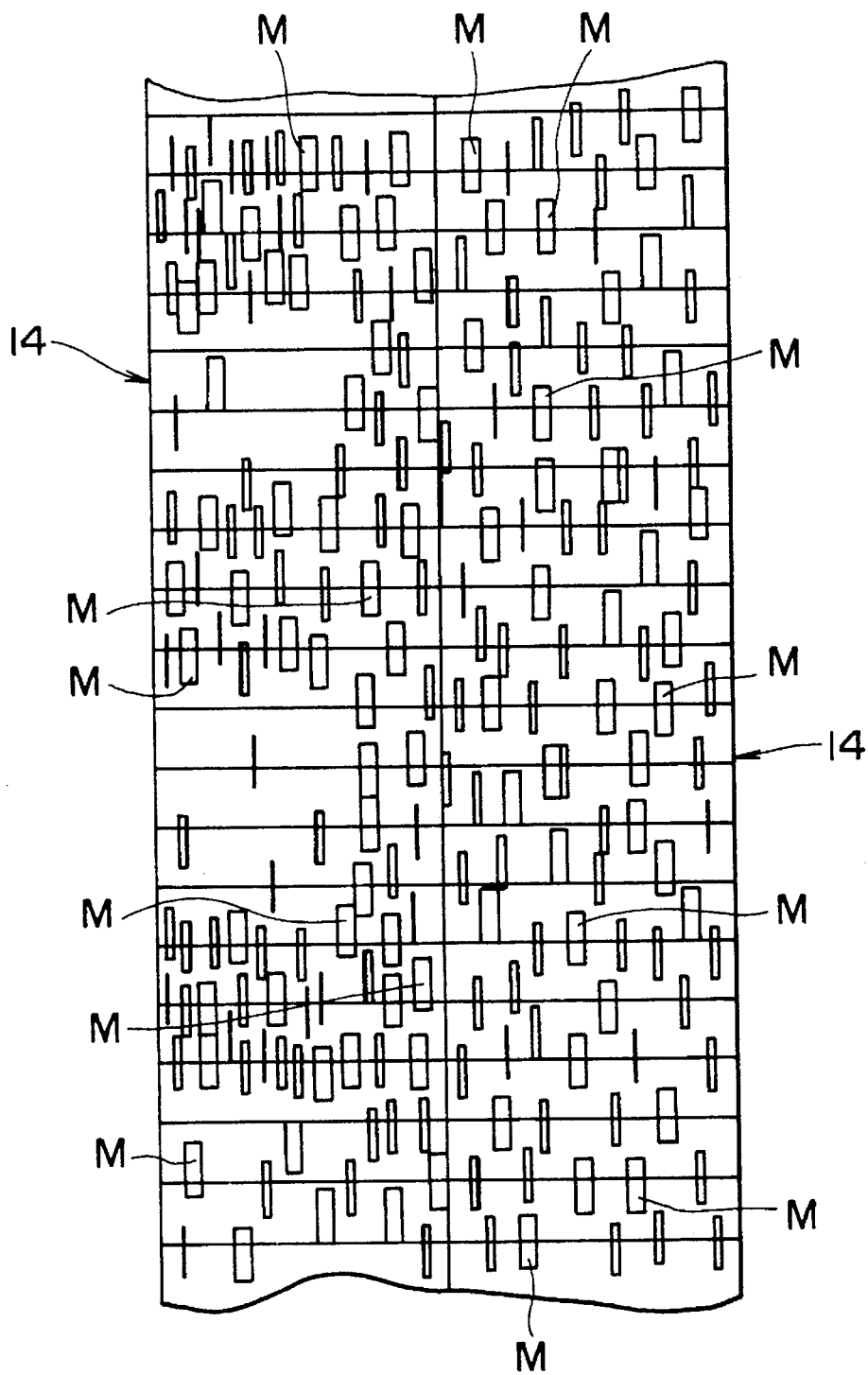
FIG. 14 is a diagram for explaining how used paper pieces are dispensed by a dry disintegration apparatus having plural impellers according to the present invention.

According to the apparatus of this embodiment, moreover, since three impellers 20 are mounted on the driving shaft 31, even when a large volume of used paper pieces are fed locally concentratedly at a time, they can be dispensed uniformly in the clearance between the second and third impellers 20 and the undulating teeth 14. FIG. 14 shows in what manner the used paper pieces are dispensed by the dry disintegration apparatus having plural impellers according to the present invention. As shown in the same figure, in the clearance formed on the left-hand side between the first-stage impeller and the undulating teeth 14 the used paper pieces M are present locally concentratedly, while in the clearance formed on the right-hand side between the second-stage impeller and the undulating teeth 14 the used paper pieces M are dispensed uniformly and their chance of striking against the teeth 14 is enhanced.

The clearance distance L0 between the outer peripheral edge of the disc 21 of each impeller 20 and each addendum tip of the undulating teeth 14 is set at a value not smaller than ten times the thickness of each used paper piece M, and the ratio [L0/(W1+W2+W3)] of the said clearance distance L0 to the sum (W1+W2+W3) of blade widths of the impellers 20 in the direction parallel to the impeller rotational axis is set at a value not larger than 0.3. As shown in FIG. 13, the said W1 indicates the width of each blade 22 of the first-stage impeller 20 in the direction parallel to the rotational axis of the impeller, W2 indicates the width of each blade 22 of the second-stage impeller 20 in the said direction, and W3 indicates the width of each blade 22 of the third-stage impeller in the said direction. Thus, it is not necessary, in principle, to change the ratio of the clearance distance L0 to the width of impeller blade in the said direction no matter whether the number of impeller 20 mounted on the driving shaft 31 may be one or plural. Rather, in the case where plural impellers 20 are mounted on the driving shaft 31, the used paper pieces M are dispensed uniformly and their chance of striking against the undulating teeth 14 increases, as mentioned above, so the sum of blade widths of the plural impellers in the foregoing direction may be smaller than in the use of a single impeller. The peripheral speed of each impeller 20 is set at 40 m or more per second.

Figure 7:
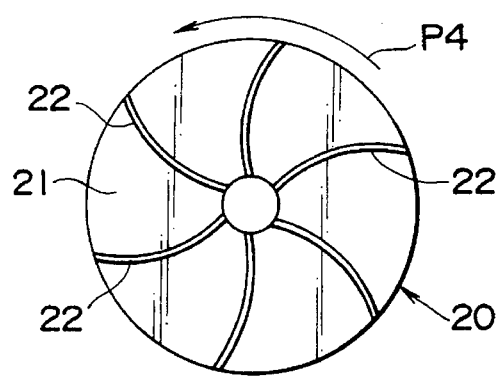
FIG. 7 is a front view showing a further example of an impeller in the apparatus of FIG. 2.

Thus, according to the used paper dry disintegration apparatus provided with plural impellers according to the present inventions not only the used paper can be disintegrated into long pulp fibers but also the amount of undisintegrated fibers can be greatly decreased, thereby permitting disintegration of used paper at a high percent disintegration. As each impeller 20 in the apparatus of FIG. 13 there may be used such an impeller having forward blades as shown in FIG. 6 or such an impeller 20 having backward blades as in FIG. 7. There also may be used an impeller having backward blades each formed with a gap G as shown in FIG. 8. Further, there may be used such a silocco fan type impeller as shown in FIG. 9.

Figure 15:
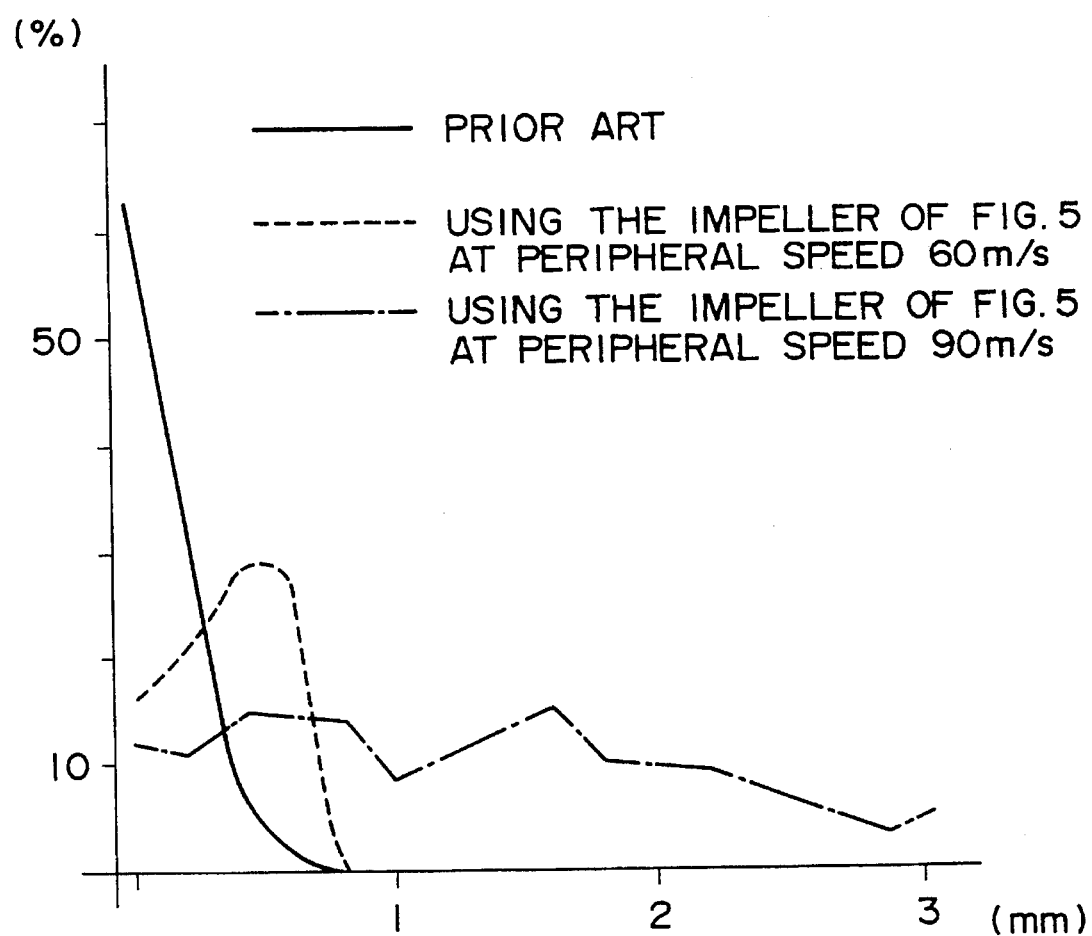
FIG. 15 is a graph showing a relation between the length of disintegrated pulp fibers and quantitative proportion thereof.

Using the apparatus according to the present invention illustrated in FIG. 13, there were conducted experiments of disintegration. The results of the experiment are as graphically show in FIG. 15, in which the length of disintegrated pulp fibers is plotted along the axis of abscissa and quantitative proportion thereof (%) along the axis of ordinate. In the same graph, the solid line represents an experimental result obtained by using the conventional apparatus shown in FIG. 13, which experiment was conducted under the conditions of clearance L0 0.6 mm and impeller peripheral speed 30 m/sec. According to the specification of the said conventional apparatus, it was impossible to perform the experiment at an impeller peripheral speed exceeding 30 m/sec. On the other hand, the broken line represents an experimental result obtained by using the apparatus of the invention, which experiment was conducted under the conditions of clearance distance L0 1 mm and impeller peripheral speed 60 m/sec. Further, the dash-double dot line also represents an experimental result obtained using the apparatus of the invention, which experiment was conducted under the conditions of clearance distance L0 1 mm and impeller peripheral speed 90 m/sec. According to these experimental results, when the impeller peripheral speed is set at 60 m/see in the apparatus of the present invention, the proportion of disintegrated pulp fibers not longer than 0.6 mm can be decreased to about one third of that obtained using the conventional apparatus. Further, when the impeller peripheral speed is set at 90 m/sec, the proportion of disintegrated pulp fibers not shorter than 1 mm becomes 60% or more, which fibers are employable as they are for recycle use.

Figure 16:
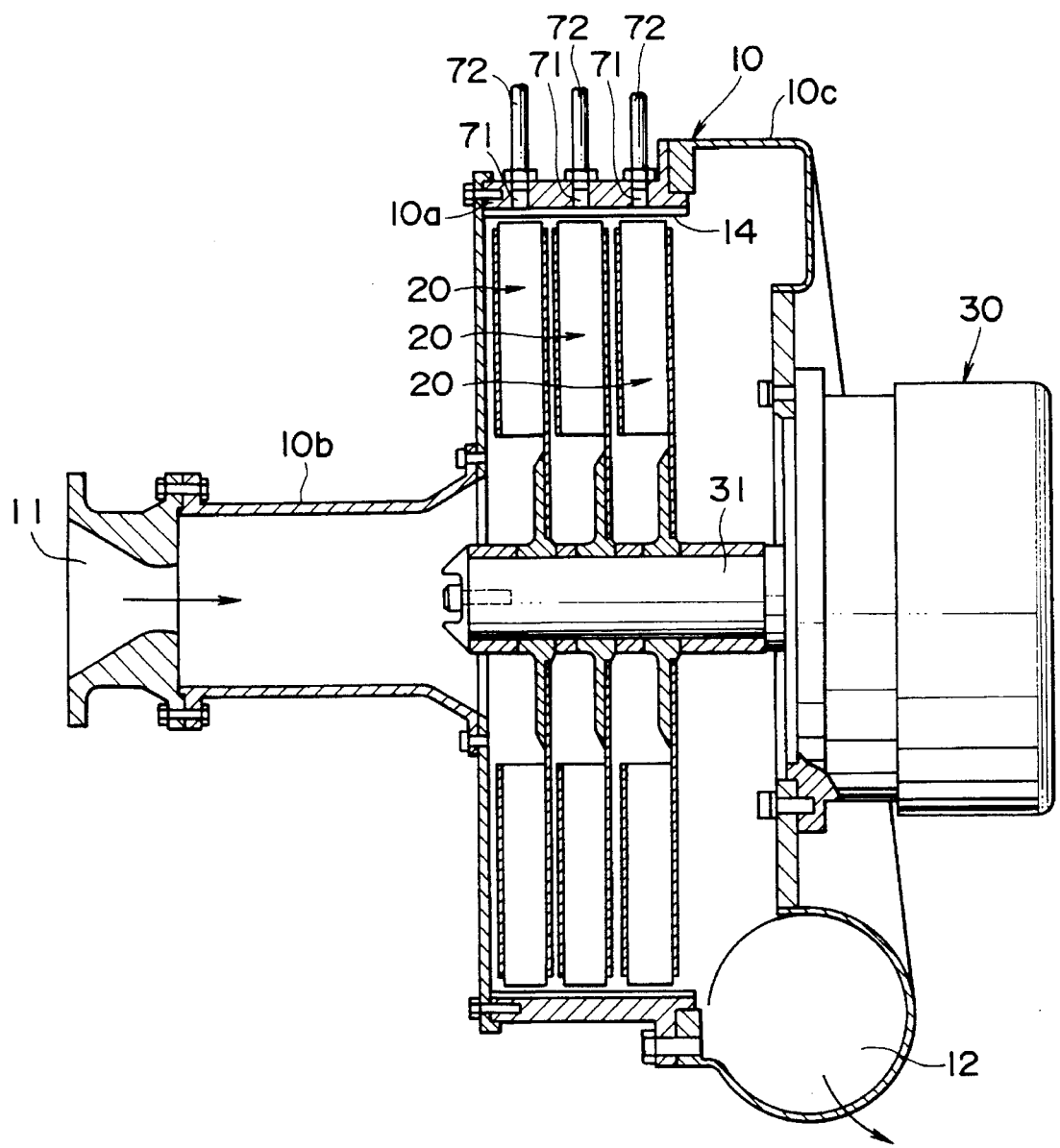
FIG. 16 is a partially sectional side view of an apparatus for dry disintegration of used paper according to a still further embodiment of the present invention.

FIG. 16 is a partially sectional side view of an apparatus for dry disintegration of used paper according to a further embodiment of the present invention. The construction of this apparatus is substantially the same as that of the apparatus illustrated in FIG. 13 except that the body member 10a of the circular casing body 10 is provided with compressed gas injection holes 71. In FIG. 16, the portions common to the apparatus shown in FIG. 13 are indicated by the same reference numerals as in FIG. 13.

As illustrated in FIG. 16, three impellers 20 are mounted on the driving shaft of the drive motor 30. Each impeller 20 has backward blades. In the cylindrical body member 10a having undulating teeth 14 formed in the inner peripheral surface thereof are formed compressed gas injection in positions corresponding to the impellers 20 which holes extend through the body member 10a and open to both inside and outside. To each of these three compressed gas injection holes 71 is connected a compressed air supply pipe 72 for the supply of compressed air from a compressed air source (not shown) through an on-off valve (not shown).

In the dry disintegration apparatus constructed as above, when a certain operating time has elapsed, the rotation of the impellers 20 is slowed down temporarily and in this state compressed air is ejected to the impellers 20 from the compressed gas injection holes 71, whereby used paper pieces and disintegrated fibers deposited on the blades of the impellers can be removed easily. In this way it is possible to prevent used paper pieces and disintegrated fibers from being deposited in a large quantity on the impeller blades with the lapse of operating time, and hence it is possible to prevent used paper pieces from being disintegrated mechanically due to imbalance in the rotation of the impellers 20 which is caused by such large quantity deposition of used paper pieces and disintegrated fibers.

Figure 17:
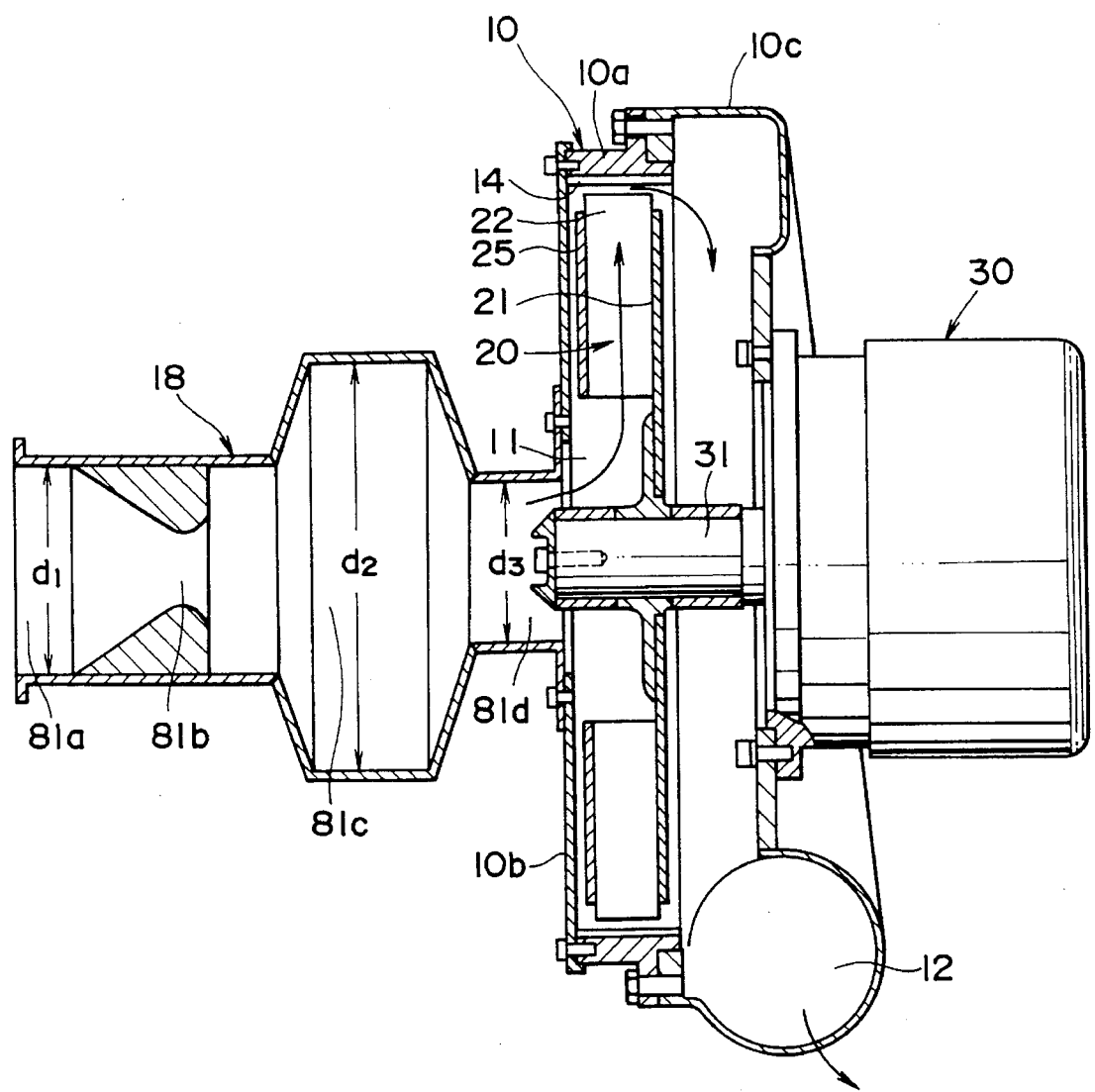
FIG. 17 is a partially sectional side view of an apparatus for dry disintegration of used paper according to a still further embodiment of the present invention.

FIG. 17 is a partially sectional side view of an apparatus for dry disintegration of used paper according to a still further embodiment of the present invention. The construction of this apparatus is substantially the same as that of the apparatus illustrated in FIG. 2. In FIG. 17, the portions common to the apparatus of FIG. 2 are indicated by the same reference numerals as in FIG. 2.

As shown in FIG. 17, a used paper suction nozzle 81 is attached to the cover member 10b in the position of the inlet port 11. The used paper suction nozzle 81, which is circular in section, has a suction port 81a at its front end, a discharge port 81d at its base end, the discharge port 81d having an inside diameter $d_3$ smaller than that of the suction port 81a, further has a hollow chamber 81c in a position intermediate between the suction port 81a and the discharge port 81d, the hollow chamber 81c having an inside diameter $d_2$ larger than that of the suction port 81a, and a throttle portion 81b formed intermediately between the suction port 81a and the hollow chamber 81c. A bent pipe (not shown) which opens upward is connected to the front end of the used paper suction nozzle 81, and finely cut used paper pieces are fed through the said bent pipe to the suction port 81a of the suction hobble 81 by means of a vibration type feeder (not shown).

In the used paper dry disintegration apparatus provided with the used paper suction nozzle 81, when finely cut used paper pieces are fed to the suction port 81a of the nozzle 81 by means of the vibration type feeder under rotation of the impeller 20, there occurs a turbulence of air current throughout the interior of the hollow chamber 81c because the throttle portion 81b is formed in the nozzle 81. As a result, within the hollow chamber 81c, the used paper pieces are disentangled and dispensed. Further, since the inside diameter $d_1$ of the suction port 81a is set larger than the inside diameter $d_3$ of the discharge port 81d, the used paper pieces stay always in an excess quantity within the hollow chamber 81c and thus the chamber 81c functions as a kind of accumulator. This accumulator function of the hollow chamber 81c permits the used paper pieces to be conducted into the circular casing body 10 always in a nearly constant amount even when the amount of used paper pieces fed varies to some extent. Accordingly, there does not occur a temporary sudden increase in the amount of used paper pieces fed into the casing body 10, and so it is possible to minimize the amount of undisintegrated fibers.

In the method for dry disintegration of used paper according to the present invention, as set forth above, finely cut used paper pieces are disintegrated not by mechanical disintegration involving tearing or grinding down the used paper pieces but by pneumatic beating involving collision of the used paper pieces carried by a current of air with undulating teeth having an undulating section. Therefore, the used paper pieces can be disintegrated into long pulp fibers in comparison with the conventional method.

According to the apparatus for dry disintegration of used paper in the third aspect of the present invention, including a circular casing body having undulating teeth formed on the inner peripheral surface of the casing body, and an impeller mounted coaxially within the circular casing body through a clearance formed between the impeller and the undulating teeth, the clearance distance between the outer peripheral end of a disc of the impeller and each addendum tip of the undulating teeth 14 is set at a value not smaller than ten times the thickness of each finely cut used paper piece, the ratio of the said clearance distance to the width of each impeller blade in the direction parallel to the rotational axis of the impeller is set at a value not larger than 0.3, and the peripheral speed of the impeller is set at a value not smaller than 40 m. Consequently, the finely cut used paper pieces can be disintegrated not by mechanical disintegration involving tearing or grinding down the used paper pieces but by pneumatic beating, so that the used paper pieces can be disintegrated into long pulp fibers in comparison with the prior art.

According to the apparatus for dry disintegration of used paper in the eleventh aspect of the present invention, since there are used a plurality of impellers, the amount of undisintegrated fibers can be reduced to a great extent and the disintegration of used paper can be done at a high percentage disintegration, in addition to the above-mentioned effect that used paper pieces can be disintegrated into long pulp fibers.

According to the apparatus for dry disintegration of used paper in the eighteenth aspect of the present invention, since a compressed gas injection hole is formed in the circular casing body, it is possible to prevent used paper pieces and disintegrated fibers from being deposited in a large quantity on the impeller blades with the lapse of operating time and hence possible to prevent used paper pieces from being disintegrated mechanically due to imbalance in the impeller rotation which is caused by such large quantity deposition of used paper pieces and disintegrated fibers.

According to the apparatus for dry disintegration of used paper in the nineteenth aspect of the present invention, since there is used a used paper suction nozzle having a hollow chamber and connected to the inlet port of the casing body, used paper pieces can be conducted always in a nearly constant amount into the casing body even when the amount of used paper pieces fed to the suction nozzle varies to some extent, and there does not occur a temporary sudden increase in the amount of used paper pieces fed into the casing body. Consequently, the amount of undisintegrated fibers can be made extremely small.

What is claimed is:

1. An apparatus for dry disintegration of finely cut pieces of used paper into fluffy pulp fibers, the apparatus comprising:

a circular casing body having an inlet port for sucking in used paper pieces together with a current of air and an outlet port for discharging disintegrated pulp fibers together with the air current, said circular casing body further having undulating teeth of an undulating section formed circumferentially on an inner peripheral surface;

an impeller which is rotatable at a peripheral speed of 40 m or more per second and having a disc and blades formed radially on one end face of said disc, said impeller being mounted coaxially within said circular casing body with a clearance formed between the impeller and said undulating teeth of the circular casing body, said clearance having a distance between an outer peripheral edge of said disc of the impeller and each addendum tip of said undulating teeth which is not less than ten times a thickness of each of said used paper pieces, and a ratio of said distance to a width of each of said blades in a direction parallel to a rotational axis of the impeller which is not higher than 0.3; and a drive motor mounted to one end face of said circular casing body, said drive motor causing rotation of said impeller to suck the used paper pieces into the circular casing body together with the air current through said inlet port of the casing body and conduct the used paper pieces into said clearance.

2. An apparatus according to claim 1, wherein a driving shaft of said drive motor is connected to an opposite end face side of said impeller, said inlet port of the circular casing body is open centrally of the opposite end face of the casing body, and said outlet port of the circular casing body is open tangentially of a peripheral surface of the casing body in a position closer to a drive motor side relative to said disc.

3. An apparatus according to claim 1 or claim 2, wherein said blades of the impeller are shorter in a radial direction of the impeller than in an axial direction of the impeller.

4. An apparatus according to claim 1 or claim 2, wherein said blades of the impeller are curved on their outer peripheral end side in a rotating direction of the impeller.

5. An apparatus according to claim 3 or claim 4, wherein said blades of the impeller are curved on their outer peripheral end side in the direction opposite to a rotating direction of the impeller.

6. An apparatus according to claim 5, wherein each said blade of the impeller has a concave side, a convex side and a gap formed in a position close to an outer peripheral end, said gap providing communication between the convex side and the concave side of the curved blade to permit passage of the air current therethrough.

7. An apparatus according to claim 1 or claim 2, wherein said blades of the impeller project radially outwards from the outer peripheral edge of said disc.

8. An apparatus according to claim 1 or claim 2, wherein outer peripheral ends of said blades of the impeller and the outer peripheral edge of said disc are in registration with each other.

9. An apparatus for dry disintegration of finely cut pieces of used paper into fluffy pulp fibers, the apparatus comprising:

a circular casing body having undulating teeth of an undulating section formed circumferentially on an inner peripheral surface;

a plurality of impellers each being rotatable at a peripheral speed of 40 m or more per second and having a disc and blades formed radially on one end face of each said disc, said impellers being mounted coaxially within said circular casing body through a clearance formed between the impellers and said undulating teeth of the circular casing body, said clearance having a distance between an outer peripheral edge of said disc of each said impeller and each addendum tip of said undulating teeth which is not less than ten times a thickness of each said used paper piece, and a ratio of said distance to a sum of each blade width of said plural impellers in a direction parallel to a rotational axis of the impellers being not higher than 0.3;

a drive motor mounted to one end face of said circular casing body and having a driving shaft connected to said impellers from an opposite end side of the impellers, said drive motor causing rotation of said impellers to suck the used paper pieces into said circular casing body together with a current of air and conduct the used paper pieces into said clearance;

an inlet port which is open centrally of the opposite end face of said circular casing body to suck in the used paper pieces together with the air current; and an outlet port which is open tangentially of a peripheral surface of said circular casing body in a position closer to a drive motor side relative to said disc to discharge disintegrated fibers together with the air current.

10. An apparatus according to claim 9, wherein said blades of the impellers are shorter in a radial direction of the impellers than in an axial direction of the impellers.

11. An apparatus according to claim 9, wherein said blades of the impellers are curved on their outer peripheral end side in a rotating direction of the impellers.

12. An apparatus according to claim 9, wherein said blades of the impellers are curved on their outer peripheral end side in a direction opposite to the rotating direction of the impellers.

13. An apparatus according to claim 12, wherein said blades of the impellers each have a convex side, a concave side and a gap formed in a position close to an outer peripheral end thereof, said gap providing communication between the convex side and the concave side of the curved blade to permit passage of the air current therethrough.

14. An apparatus according to claim 9, wherein said blades of the impellers project radially outwards from the outer peripheral edge of said disc.

15. An apparatus according to claim 11, wherein outer peripheral ends of said blades of the impellers and the outer peripheral edge of said discs are respectively in registration with each other.

16. An apparatus for dry disintegration of finely cut pieces of used paper into fluffy pulp fibers, the apparatus comprising:

a circular casing body having an inlet port for sucking in used paper pieces together with a current of air and an outlet port for discharging disintegrated pulp fibers together with the air current, said circular casing body further having undulating teeth of an undulating section formed circumferentially on its inner peripheral surface;

an impeller mounted coaxially within said circular casing body through a clearance formed between the impeller and said undulating teeth of the circular casing body, said impeller having a disc and blades formed radially on one end face of the disc;

a drive motor mounted to one end face of said circular casing body, said drive motor causing rotation of said impeller to suck the used paper pieces into the circular casing body together with the air current through said inlet port of the casing body and conduct them into said clearance; and a compressed gas injection hole formed in said circular casing body to eject compressed gas for removing used paper pieces and disintegrated fibers deposited on said blades of the impeller.

17. An apparatus for dry disintegration of finely cut pieces of used paper into fluffy pulp fibers, the apparatus comprising:

a circular casing body having an inlet port for sucking in used paper pieces together with a current of air, an outlet port for discharging disintegrated pulp fibers together with the air current, and undulating teeth of an undulating section formed circumferentially on its inner peripheral surface;

an impeller mounted coaxially within said circular casing body through a clearance formed between the impeller and said undulating teeth of the circular casing body, said impeller having a disc and blades formed radially on one end face of the disc;

a used paper suction nozzle connected to said inlet port of the circular casing body, said used paper suction nozzle having a suction port at a front end thereof, a discharge port at a base end thereof which discharge port is smaller in inside diameter than said suction port, a hollow chamber formed intermediate between said suction port and said discharge port and having an inside diameter larger than that of the suction port, and further having a throttle portion formed intermediate between said suction port and said hollow chamber; and a drive motor mounted to one end face of said circular casing body, said drive motor causing rotation of said impeller to suck the used paper pieces into the circular casing body together with the air current through said used paper suction nozzle and further through said inlet port of the casing body and conduct the used paper pieces into said clearance.

18. An apparatus for dry disintegration of used paper, including an impeller mounted within a circular casing body having an inlet port and an outlet port, with grooves parallel to a rotational axis of said impeller being formed in an inner peripheral surface of said circular casing body, wherein a distance, L0, between an outer peripheral end of each blade of said impeller and an addendum tip of a groove of said grooves opposed thereto and formed in the inner peripheral surface of the circular casing body is not less than ten times a thickness of the used paper, a ratio of said distance L0 to a width, W, of each impeller blade in a direction parallel to the rotational axis of the impeller, being not higher than 0.3, and a peripheral speed of said impeller during rotation being set at 40 m or more per second.

* * * * *